United States Patent

Lopez-Torres et al.

[19]

[11] Patent Number: 5,940,759

[45] Date of Patent: Aug. 17, 1999

[54] COMMUNICATION SYSTEM SWITCHING MEANS AND METHOD FOR SETTING-UP CALLS OF DIFFERENT TYPES BETWEEN A CALL ORIGINATING SUBSCRIBER AND A MOBILE SUBSCRIBER OF A MOBILE RADIO COMMUNICATION NETWORK

[75] Inventors: Oscar Lopez-Torres, Aachen, Germany; Juan Sanches Herrero, Madrid, Spain

[73] Assignee: Telefonaktiebolaget LM Ericsson, Stockholm, Sweden

[21] Appl. No.: 08/848,166

[22] Filed: Apr. 29, 1997

[30] Foreign Application Priority Data

May 3, 1996 [DE] Germany .................. 196 17 798

[51] Int. Cl.[6] .............. H04M 11/00; H04Q 7/22
[52] U.S. Cl. .......... 455/433; 455/560; 455/445; 379/219
[58] Field of Search ............. 455/433, 435, 455/414, 436, 428, 560, 438, 445, 418, 419; 379/210, 207, 212, 219, 229, 242, 243, 201

[56] References Cited

U.S. PATENT DOCUMENTS

| 5,309,501 | 5/1994 | Kozik et al. ..................... 455/433 |
| 5,329,573 | 7/1994 | Chang et al. .................... 455/433 |
| 5,845,211 | 12/1998 | Roach, Jr. ...................... 455/433 |

FOREIGN PATENT DOCUMENTS

| 0 630 166A2 | 6/1994 | European Pat. Off. ....... H04Q 7/04 |
| 44 15 734 C1 | 5/1994 | Germany ..................... H04Q 7/00 |
| 91/18483 | 5/1991 | WIPO ......................... H04Q 7/04 |

OTHER PUBLICATIONS

"Principles of Telecommunication Services Supported by a GSM Public Land Mobile Network" (GSM 02.01, ETSI, May 1994.

"General Requirement on Interworking Between the Public Land Mobile Network (PLMN) and the Integrated Services Digital Network (ISDN)" ETSI, Mar. 1995.

Digital Subscriber Signalling System No. 1 (DSS 1) — ISDN User–Network Interface Layer 3, Specification for Basic Call Control; ITU–T Recommendations Q–931, Mar. 1993.

"ISDN Access Call Control Switching and Signalling Requirements — Supplement 1", Bellcore Jun. 1990.

"Integrated Services Digital Network (ISDN); User-network Interface Layer 3; Specifications for Basic Call Control" ETSI, Dec. 1990.

"European Digital Cellular Telecommunications System (Phase 2); General on Terminal Adaptation Functions (TAF) for Mobile Stations (MS)" (GSM 07.01), ETSI, Sep. 1995.

"Specifications of Signalling System No. 7" Recommendations Q721–Q766, CCIT, Geneva 1986, pp. 221, 238, 239.

Primary Examiner—Curtis A. Kuntz
Assistant Examiner—Binh K. Tieu
Attorney, Agent, or Firm—Burns, Doane, Swecker & Mathis, L.L.P.

[57] ABSTRACT

The invention relates to a setting-up of calls of different types between a subscriber and a mobile subscriber of a mobile radio communication network. The subscriber can initiate calls of different types by specifying compatibility information in the call set-up request and a home location register (HLR) in the mobile radio communication network (PLMN) obtains all attributes of the mobile bearer capability needed for any specific type of call in the PLMN, even if the compatibility information is filtered due to the transfer of the call set-up request through the network protocols. Instead of having to remember a plurality of numbers for a plurality of different types of calls, the subscriber may only use one single number and the compatibility information to specify the entire requirements of bearer capabilities necessary to support the call in the PLMN. Instead of using the conventional multiple-numbering scheme, the invention regenerates missing bearer capability attributes by using a contour selection matching process.

41 Claims, 9 Drawing Sheets

| 8 | 7 | 6 | 5 | 4 | 3 | 2 | 1 | OCTETS |
|---|---|---|---|---|---|---|---|---|
| 0 | 0 | 0 | BEARER CAPABILITY | | | 0 | 0 | 1 |
| | | | INFORMATION ELEMENT IDENTIFIER | | | | | |
| | | | LENGTH OF THE BEARER CAPABILITY CONTENTS | | | | | 2 |
| 1 EXT. | CODING STANDARD | | INFORMATION TRANSFER CAPABILITY | | | | | 3 |
| 1 EXT. | TRANSFER MODE | | INFORMATION TRANSFER RATE | | | | | 4 |
| 1 EXT. | | | RATE MULTIPLIER | | | | | 4.1 |
| 0/1 EXT. | 0 LAYER 1 IDENT. | | USER INFORMATION LAYER 1 PROTOCOL | | | | | 5 |
| 0/1 EXT. | SYNCH./ ASYNCH | NEGOT. | USER RATE | | | | | 5a |
| 0/1 EXT. | INTERMEDIATE RATE | | NIC ON Tx | NIC ON Rx | FLOW CONTROL ON Tx | FLOW CONTROL ON Rx | 0 SPARE | 5b |
| 0/1 EXT. | HDR/ NO HDR. | MULTI FRAME | MODE | LLI NEGOT. | ASSIGNOR | IN-BAND NEG. | 0 SPARE | 5b |
| 0/1 EXT. | NUMBER OF STOP BITS | | NUMBER OF DATA BITS | | PARITY | | | 5c |
| 1 EXT. | DUPLEX MODE | | MODEM TYPE | | | | | 5d |
| 1 EXT. | 1 LAYER 2 IDENT. | 0 | USER INFORMATION LAYER 2 PROTOCOL | | | | | 6 |
| 1 EXT. | 1 LAYER 3 IDENT. | 1 | USER INFORMATION LAYER 3 PROTOCOL | | | | | 7 |

FIG. 4B

COMMUNICATION SYSTEM SWITCHING MEANS AND METHOD FOR SETTING-UP CALLS OF DIFFERENT TYPES BETWEEN A CALL ORIGINATING SUBSCRIBER AND A MOBILE SUBSCRIBER OF A MOBILE RADIO COMMUNICATION NETWORK

1. FIELD OF THE INVENTION

The invention relates to a communication system, a switching means and a method for setting-up calls of different types between a subscriber, which originates the call, and a mobile subscriber of a mobile radio communication network. The typical structure of a communication system having interlinked networks, to which the invention is applicable, is shown in FIG. 1.

A fixed network FN and a first mobile radio communication network PLMN-A are interlinked via a network interface NI. The fixed network FN can be a public switched telephone network PSTN (e.g. a national telephone network), an integrated services digital network ISDN or a packet switched public data network PSPDN and provides to the fixed subscribers SS1, SS2, SS3, SS4 a wide range of services and facilities via a determined access point, which is schematically shown as a fixed network switching means FNSW in FIG. 1. A similar architecture is shown in FIG. 6 of EP 0 630 166 Al.

The first mobile radio communication network (a public land mobile network; e.g. a D1 or D2 network) PLMN-A can be a global system for mobile communications GSM, a digital cellular system at 1800 MHz (DCS 1800), or a personal communication system (PCS) and provides to the mobile stations MS1, MS2, MS3, MS4 a wide range of services and facilities via a mobile network switching means MNSW-A. While the subscriber stations SS1, SS2, SS3, SS4 have a fixed arrangement (shown with the solid lines in FIG. 1), a mobile radio communication network provides radio communications between the individual mobile stations MS1, MS2, MS3, MS4, which are roaming about between individual cells of the mobile radio communication network (as is shown in FIG. 2). The radio nature and the roaming nature of the mobile radio communication network is in FIG. 1 schematically shown with the dotted lines. A communication system, where a GSM-system and an ISDN-system are connected is shown in WO 91/18483. A GSM/ISDN interworking is achieved by utilization of B/D channels. Special emphasis is here given to the mapping of data packets between the ISDN D channels and the GSM traffic channels.

Another second mobile radio communication network PLMN-B also having a mobile network switching means MNSW-B serving mobile stations MS5–MS8 can be optionally provided in FIG. 1. The internal functions of PLMN-B are analogous to those of PLMN-A. PLMN-A, PLMN-B may be disposed in the same country (e.g. in Germany PLMN-A can be a D1 network and PLMN-B can be a D2 network or vice versa) or may be disposed in two different countries.

In each network FN, PLMN-A, PLMN-B the respective switching means not only enable communications between the respective subscribers connected to the respective network, but also to subscribers of the respective other networks. As will be seen in more detail in FIG. 2, 3 different cases may be distinguished of how communication may be desired between the individual subscribers in FIG. 1. Case A: a subscriber SS1–SS4 of the fixed network may wish to communicate with a mobile station MS1–MS4 of PLMN-A; case B: a mobile station MS1–MS4 of the first mobile radio communication network PLMN-A may wish to communicate with another mobile station MS1–MS4 of PLMN-A; and case C: a mobile station MS5–MS8 of the second mobile radio communication network PLMN-B may wish to communicate with another mobile station MS1–MS4 of the first radio mobile communication network PLMN-A. Whilst in case A obviously the fixed network FN is involved, since the call originating subscribers belong the FN, also in cases B, C the fixed network FN is invariably involved in the setting up procedure, since communication is set-up by using the fixed network switching means FNSW (this is indicated in FIG. 1 with the dashed lines between the individual networks PLMN-A, PLMN-B, FN).

The mobile radio communication network PLMN-A, PLMN-B is a very advanced network, that can provide a number of services to its mobile stations. Such services comprise radio communication services, i.e. communication capabilities made available to the mobile station by the network operators, and basic services BS, which are some telecommunication services being considered as very basic. These basic telecommunication services are organized into basic service groups BSGs consisting of bearer services and teleservices (reference [1]: Principles of Telecommunication Services Supported by a GSM Public Land Mobile Network (PLMN) (GSM 02.01); ETSI, European Telecommunications Standards Institute; May 1994).

Bearer services generally provide the capability of signalling transmission between access points within the PLMN and are characterized by low OSI layer attributes. By contrast, teleservices provide the complete capability, including terminal equipment function for communication between users. They are characterized by both low and high OSI layer attributes.

Therefore, when the call originating subscriber SS1–SS4; MS1–MS4; MS5–MS8 wants to communicate with one of the mobile stations MS1–MS8, it does not only have to specify the calling number of the mobile subscriber, but he also has to specify some compatibility information indicating what kind of service of the PLMN he wishes to use, i.e. what kind of call he wants to have set up to the mobile station (reference [2]: General Requirements on Interworking between the Public Land Mobile Network (PLMN) and the Integrated Services Digital Network (ISDN) (GSM 09.07); ETSI, European Telecommunications Standards Institute; March 1995).

Thus, the compatibility information is a set of attributes defining the technical features to support a call in the PLMN-A. These attributes are included in the bearer capability and optionally in the higher layer compatibility and lower layer compatibility information elements. The bearer capability is a coding of low layer attributes used for the characterization of the basic services. Thus, the bearer capabilities define the technical features of the call as they appear to the user at the appropriate access point. For example, an ISDN bearer capability is used to indicate the requested basic service to be provided by an ISDN network (reference [3]: Digital Subscriber Signalling System No. 1 (DSS 1)—ISDN User-Network Interface Layer 3, Specification for Basic Call Control; ITU-T (International Telecommunication Union) Recommendations Q-931; March 1993). Likewise, a mobile bearer capability is used to indicate the requested basic service to be provided by the PLMN (this concept is used in this application to refer to the GSM bearer capability (provided by the GSM/DCS network) and the PCS bearer capability (provided by the PCS network)). The mobile BC can be considered a translation of the ISDN BC and contains more attributes representing the radio air-interface of the PLMN. It can be a representation of the ISDN bearer capability, the lower layer compatibility LLC and the higher layer compatibility HLC combined (reference [2]).

As aforementioned, when one of the subscribers SS1, SS2, SS3, SS4 or one of the mobile stations MS1–MS4 or one of the mobile stations MS5–MS8 wants to have set-up a basic service mobile terminating call (MTC) between the integrated services digital network ISDN and the public land mobile network PLMN, within the PLMN-A or between PLMN-B and PLMN-A, then invariably it must provide not only the calling number of the mobile station but also the compatibility information for the requested service in a call set-up request, in order to indicate the kind of bearer capability to support the desired type of call, e.g. data, facsimile, speech. However, in the setting-up of a connection between the call originating subscriber the mobile radio communication network PLMN-A, i.e. when handling a basic service and mobile terminating call MTC, a combination of network protocols are involved (see ①, ②, ③, ④, in FIG. 2), which may filter out the required compatibility information. This may prevent the setting-up of a call (reference [4]: ISDN Access Call Control Switching and Signalling Requirements—Supplement 1; Bellcore June 1990) and the call of a specific type may fail.

Thus, the setting-up of a call between a subscriber and a mobile station is complicated, since always the network protocols between the FN and the PLMN-A are involved and specific hardware in the mobile radio communication network PLMN-A (or PLMN-B) is required, as will be further detailed below.

2. BACKGROUND OF THE INVENTION

The function of various network protocols causing the problems of setting up a subscriber-mobile station connection will be further illustrated with reference to FIG. 2, which shows a more detailed internal structure of FN, PLMN-A and PLMN-B.

Let's first consider the case A mentioned above, where a fixed subscriber wishes to set-up a call to a mobile station of PLMN-A. Here the fixed subscribers SS1–SS4 are respectively connected to a private branch exchange PABX 1, 2 (a customer premises equipment CPE) via an internal access protocol ①. The private branch exchanges PABX1, PABX2 are linked via a access protocol ②: DSSI or a national access protocol to a ISDN/digital originating exchange O-EX1. This originating exchange O-EX1 is connected to the ISDN/digital terminating exchange T-EX via a ISDN user part (ISUP) protocol ③, a national user part (NUP) protocol or an analog signalling protocol. The network interface NI uses a ISUP, a national user part (NUP) protocol or analog signalling protocol ④ for a connection to the PLMN-A network. The just mentioned protocols are used for communication between the different entities in the communication network. The signalling system No.7 is used to transport these protocols.

As aforementioned, the ISDN user part (ISUP), a mobile application part (MAP) or a national user part (NUP) are used as network protocols. The combination of different protocol interfaces required to signal an ISDN (or digital) originating call to a PLMN-A may however filter out required compatibility information involved in a basic service mobile termination call MTC, as explained above.

In the above mentioned case B, where a mobile station MS* in the PLMN-A wants to communicate with another mobile station MS1–MS4 in the PLMN-A, respective set-up messages are send also to an originating exchange O-EX2 of FN and again the various protocols used may filter out compatibility information. Likewise, in the above mentioned case C, where a mobile station MS* in the PLMN-B wants to communicate with another mobile station MS1–MS4 in the PLMN-A, respective set-up messages are send also to an originating exchange O-EX3 of FN and the various protocols used may filter out the respective compatibility information (It may be noted that the schematically illustrated HLR in PLMN-B is only used for terminating a call to a mobile subscriber in PLMN-B, however, it is not involved for setting up a call from a mobile subscriber of PLMN-B to a mobile subscriber of PLMN-A)

Hereinafter it will be explained how the setting up of different types of calls is conventionally done. First, case A will be illustrated. In order to still allow the setting-up of different types of calls between the fixed subscriber stations and the mobile stations, the conventional technique is to use a method called "multiple-numbering scheme", in order to determine the required bearer capability in the mobile radio communication network (reference [2]). Since this technique uses devices of the PLMN network, e.g. a home location register HLR and a visitor location register VLR, these fundamental devices of every mobile radio communication network are briefly described with reference to FIG. 2. As is well known, the mobile radio communication network is divided into different cells 0, 1, 2, 3, which each have at least one base station transmitter BTS controlled by a base station controller BSC. There are several mobile services switching centers MSC, wherein the first MSC, to which a mobile terminating call is routed from the FN, is called the gateway mobile services switching center GMSC, as is shown in cell 3 in FIG. 2. The GMSC interrogates a home location register HLR, which is a database used by the PLMN to manage all mobile subscribers (see FIG. 3b), and performs the routing function to the mobile switching center MSC, where the mobile station is located (e.g. in cell 0). The mobile services switching center MSC performs all the switching functions needed for mobiles located in an associated geographical area (cell). Interworking with other networks needs the presence of specific functions associated with the MSC. These functions are contained in the interworking function (IWF).

A visitor location register VLR is a database used by the PLMN to dynamically store information of the mobile subscriber, such as the location area, where the subscriber is located or is roaming. The VLR also contains devices to handle mobile originating and terminating calls. Such an interconnection of HLR, VLR, MSC and a base station system is also disclosed in DE 44 15 734 C1.

Since the "multiple-numbering scheme" is essentially provided to derive a bearer capability BC necessary for the type of call made by the fixed subscriber, hereinafter the role and requirements for bearer capabilities in PLMNs will be further highlighted.

The bearer capability BC is required to define a bearer service or teleservice, i.e. it defines the technical features of the call as they appear to the user at the appropriate access point, i.e. the modem etc. This bearer capability can optionally be complemented by the higher layer compatibility information and the lower layer compatibility information (the purpose of the higher layer compatibility information is to provide a means to use by some remote ISDN-user for compatibility checking). It is used for teleservices characterization with the lower layer attributes included in the bearer capability. The lower layer compatibility LLC information element is to provide a means to use for compatibility checking by an addressed entity; e.g. a remote user, an interworking unit, or a network node higher layer function addressed by the calling user. The lower layer compatibility information element is transferred transparently between the call originating station, i.e. the calling mobile subscriber, and the address station (reference [5]: Integrated Services Digital Network (ISDN); User-Network Interface Layer 3; Specifications for Basic Call Control; ETSI, European Telecommunications Standards Institute; December 1990). That is, the bearer capability represents the type or characteristic of a mobile call.

The call originating subscriber SS1–SS4 initiates the call from a subscriber station linked to the public switched telephone network PSTN (see FIG. 2) or an integrated services digital network (ISDN) or even from another PLMN. In this respect, the called party is of course the mobile station in the PLMN-A, as is illustrated in FIG. 2. For example, in setting-up a call having a non-speech type, if interworking between the PLMN and the PSTN is required, the "multiple-numbering scheme" technique is used to provide a mobile bearer capability BC to the called mobile station with ISDN number MS–ISDN (the MS-ISDN is the mobile subscriber ISDN identity assigned to a calling subscriber for mobile originating calls or called subscriber for mobile terminating calls).

When setting up a call from a fixed subscriber station to a mobile station, this MS-ISDN is for example the calling number of the mobile station. In GSM- or DCS- or PCS-networks, an MS-ISDN addresses a mobile subscriber as opposed to a specific location or apparatus used by the mobile subscriber. Thus, the MS-ISDN addresses directly the mobile subscriber independent from the particular mobile station into which the mobile subscriber has inserted his SIM-card. That is, the "multiple-numbering scheme" provides the requested information about which mobile bearer capability BC to use together with the MS-ISDN during a call-set up request. An ISDN-interworking requires the signalling of such bearer capability information (i.e. bearer capability, lower layer and higher layer compatibility), to derive a proper call during call set-up. This information is conveyed to the customer premises equipment (e.g. the private branch exchange PABX or an ISDN-terminal), to further define the specific requirements of the type of call.

Independent of the type of fixed network (ISDN or PSTN), the first stage in setting-up a call is to exchange some signalling information between the calling subscriber station and the mobile radio communication network, in order to establish a signalling path between them.

The second stage is the derivation of the appropriate bearer capability for the type of call originated by the subscriber station of the fixed network or another mobile station. Here, ISDN and PSTN are different. In the ISDN-PLMN-A case, the second stage at call-set-up is the transfer of some compatibility information by the ISDN-protocol to the PLMN in order to characterize the requested basic service (bearer service or teleservice). In case this complete compatibility information is indeed received by the PLMN-A, it will provide the bearer service, which is adapted to handle the basic service which is characterized by the compatibility information transmitted.

However, as afore-said, the use of several network protocols almost always destroys part of the compatibility information, which is subsequently not received in full at the PLMN-A, which is therefore at a loss which kind of bearer capability it should provide for the requested type of call.

The second stage for the PSTN-PLMN-A case also requires the provision of bearer capabilities. However, due to the analog speech nature of the PSTN, it was never adapted to provide some compatibility information, even if the type of call, which is originated, is a different call, e.g. involving the transmission of facsimile data instead of speech. For example, the fixed subscriber station may just hook up a modem and will indeed be able to transmit facsimile data, however, it cannot indicate to the PLMN-A, which kind of bearer capability is necessary in the PLMN-A, since the subscriber station itself has not transferred compatibility information which could characterize a requested bearer service. Thus, the PLMN (geared to an ISDN-interconnection) views a PSTN as a network providing a bearer service similar to an ISDN 3.1 KHz bearer service (since the PSTN in general provides an analog network with only 3.1 KHz voice or voice band data services). Hence, while the ISDN, PSTN interconnection to a PLMN-A is different in as much that the former does intend to characterize the type of call via some compatibility information (which however unfortunately does not arrive in full at the PLMN), and that the latter cannot provide any compatibility information at all even when requesting a non-speech type call, both are similar in the disadvantage, that the PLMN-A does not exactly know which kind of bearer capability it is supposed to provide for the type of call (type of bearer service or telecommunication service). To remedy this, conventionally the afore-mentioned "multiple-numbering scheme" is employed in the HLR, as will be explained in the following with reference to FIG. 3.

Even in the aforementioned cases B, C of communication of a mobile station MS* of PLMN-A or PLMN-B, respectively, and a mobile station MS1–MS4 of PLMN-A the same disadvantages of filtering compatibility information during call-setup occur, since the respective MSC* sets up the call through the FN by creating set-up messages to the respective O-EX2, O-EX3, which have the same format as those created by PABX1, PABX2. Again these messages undergo the filtering in network protocols ③, ④.

Multiple-numbering scheme

FIG. 3a, 3b show the signalling between the PLMN and the ISDN or PSTN. As may be seen from FIG. 3b, the main device responsible for handling the multiple numbering scheme is a specific arrangement of a home location register HLR. In the following, the PSTN-case and the ISDN-case will be treated simultaneously for simplification. Although only schematically illustrated in FIG. 3a, it should be understood, that the following procedure of setting up a call between a fixed subscriber and a mobile station of PLMN-A is similarly applicable to the case where the call set-up request comes from the mobile station MS* in PLMN-A or PLMN-B for communication with one of the mobile stations MS1–MS4 of PLMN-A.

As is seen in FIG. 3a, b, c, during the second stage of call set-up, the terminating exchange T-EX (independent of whether the call is originated from a fixed subscriber SS1–SS4 or a mobile station MS*) transfers via the network interface NI an initial address message IAM to the GMSC. This message has the following format for ISDN and PSTN:

PSTN: IAM (MS-ISDN$_k$);

ISDN: IAM (MS-ISDN$_k$, optional BC$_k$, optional LLC, optional HLC);

As explained above, the PSTN can only transfer the MS-ISDN and no compatibility information whatsoever. Thus, the GMSC either receives no bearer capability information at all or incomplete bearer capability information filtered by the network protocols, even if optionally defined as $BC_k$ in the ISDN-case (reference [2]). The home location register HLR contains entries individually associated with each subscriber of the network PLMN. For each mobile subscriber 1, 2 etc., there is stored a plurality of MS-ISDN/bearer capability $BC_1$, $BC_2$, . . . , BCN pairs. A basic MS-ISDN relates to "speech" bearer capability, for example when the set-up request is made from a PSTN. There are additional pairs of MS-ISDN/BC identifications for "data", "fax G2/3" etc. As can be seen from FIG. 3b, according to the specified incoming number MS-ISDN (MS-ISDN, $MS\text{-}ISDN_1$, $MS\text{-}ISDN_2$, $MS\text{-}ISDN_N$), the home location register HLR can provide in response to the send routing information SRI command a provide roaming number message PRN to a visitor location register VMSC/VLR, in which the required bearer capability is derived from the respective pair indicated for the specific called subscriber of PLMN-A.

Thus, the listing of multiple MS-ISDN numbers in the home location register provides the appropriate bearer capabilities, even if no (PSTN case) or insufficient (filtered by the network protocols in the ISDN-case) compatibility information is received. This is indicated with case A in FIG. 3c. Only in the unusual case B and only for the ISDN/PLMN case where the compatibility information is not filtered, the bearer capability can be deduced/translated from the received compatibility information/optional HLC, as is indicated in FIG. 3c.

This procedure is called "multiple-numbering scheme", since in both cases A, B the home location register HLR will have to store for each subscriber of PLMN-A the plurality of MS-ISDN/BC association pairs.

Thus, if the fixed subscriber (or the mobile station MS* in PLMN-A or PLMN-B) wants to initiate a call set-up for a facsimile call, it will dial (transmit) a different MS-ISDN number (which it knows beforehand and which is beforehand stored in the home location register HLR), in order to make sure that the PLMN provides the correct bearer capabilities dedicated to supporting such a facsimile basic service. That is, each MS-ISDN is always defined and related to a specific bearer service or teleservice, when interworking with the PSTN.

Thus, when interworking with the ISDN, the multiple-numbering scheme is also used, if insufficient bearer capability information (i.e. compatibility information) is received by the HLR. Following the GSM/DCS standards, subscriber stations assign multiple MS-ISDNs to bearer service and/or teleservice to provide different types of mobile terminating calls, i.e. different types of calls. The bearer services and teleservices might be of extensive and various types, as defined by the PLMN standards. The mobile subscribers thus need to request from the mobile operator several subscriptions for each of their data service applications supporting different data rates. Since there are different combinatorial characteristics defining these bearer services and teleservices (e.g. facsimile calls, unrestricted digital data calls, 3.1 KHz data calls of synchronous, asynchronous, packet, non-packet, PAD, transparent or non-transparent type and also of the different access user rate of 300 bps, 1200 bps, 75/1200 bps, 2400 bps, 4800 bps, 9600 bps; bps=bit/s) the home location register HLR must be very large and the mobile subscriber must apply for a large variety of subscriptions from the PLMN-operator (reference [6]: European Digital Cellular Telecommunications System (Phase 2); General on Terminal Adaptation Functions (TAF) for Mobile Stations (MS) (GSM 07.01); ETSI, European Telecommunications Standards Institute; September 1995).

Apart from this, there is another major disadvantage, that the setting-up of the calls may even fail when using the multiple-numbering scheme, as will be briefly explained below.

Assume a case, where the subscriber station SS1 (connected to an ISDN-network) wishes to originate the said facsimile transmission to the mobile station. Assume further, that by accident not the appropriate $MS\text{-}ISDN_2$ (see FIG. 3b), but the incorrect $MS\text{-}ISDN_1$ is included in the IAM and SRI message transferred to the home location register HLR. The HLR will thus provide bearer capability BC1 in the PRN message to the visitor location register. This means, that the visiting location register in the second stage of call set-up sets up a call with bearer capabilities $BC_1$ dedicated to "data". The result is obvious: the call fails, since "facsimile data" are transferred up to the PLMN, while the PLMN provides a bearer capability adapted for "data".

Thus, the disadvantages of the multiple-numbering scheme when using a PSTN/PLMN or a ISDN/PLMN interconnection can be summarized as follows:

a) The fixed subscriber or the mobile station MS* must employ a large number of MS-ISDN numbers for each and every different type of call or type of service (basic service or telecommunication service);

b) the call set-up will fail, if a MS-ISDN is specified, which does not correspond to the specific type of call desired;

c) the transmitting of compatibility information (in the ISDN-case B in FIG. 3c) only makes sense, if it arrives unfiltered, since only then the bearer capability can be derived directly without the multiple-numbering scheme. If the compatibility information arrives complete without being filtered by the network protocols, only then the HLR can make use of this transferred compatibility information for deriving the appropriate bearer capability BC. However, if the compatibility information is indeed filtered via the network protocols, then the HLR cannot use this information at all and compatibility information h as been transmitted in vain.

3. SUMMARY OF THE INVENTION

Therefore, the object of the present invention is, to provide a communication system, a switching means and a method for setting-up call s of various types between a call originating subscriber and mobile subscriber of a mobile radio communication system, that are easy to use, require less storage space in the HLR and only require a single-number MS-ISDN for setting up a variety of different types of calls to the mobile subscriber.

This object is solved by a method for setting-up calls of different types between a call originating subscriber (SS1–SS4; MS1–MS8) and a mobile subscriber (MS) of a mobile radio communication network (PLMN-A) having a fixed network (FN; ISDN, PSTN, PSPDN) connected thereto, comprising the following steps:

a) sending (S1, S2) a call set-up request (IAM, SRI) having a first portion including a calling number (MS-ISDN) of a called mobile subscriber (MS) and a second portion including information about the type of call requested from the subscriber to a switching means (PABX, CPE, O-EX, T-EX) of the fixed network; and b) transferring (S3, S4, S5) said call set-up request (IAM, SRI) from said fixed network switching means to a switching means (GMSC, HLR, VMSC/VLR, MSC) of the mobile radio communication network via a network interface (NI, ISUP); and c) comparing a content of said second portion of said call set-up request (SRI) having been transferred to the mobile radio communication network switching means with a number of bearer capability contours (BCC11–BCCN1; BBC12–BCCN2) predefined for each subscriber of the mobile radio communication network and respectively representing a specific service supported by the mobile radio communication network for handling the different types of calls; and d) selecting a predefined bearer capability contour which provides a best match to said content of said second portion; and e) composing a final mobile bearer capability ($BC_F$) from said content of said transferred second portion and said best match selected predefined bearer capability contour; and f) allocating bearer capabilities (BC) in the mobile radio communication network in accordance with said final mobile bearer capability ($BC_F$); and g) setting-up said call requested by said call set-up request to said mobile subscriber (MS) using said calling number of the mobile subscriber (MS-ISDN) and said allocated bearer capabilities.

The object is solved by a method for setting-up calls of different types between a call originating subscriber (SS1–SS4; MS1–MS8) and a mobile subscriber (MS) of a mobile radio communication network (PLMN-A) having a fixed network (FN; ISDN, PSTN, PSPDN) connected t hereto, comprising the following steps:

a) sending (S1, S2) a call set-up request (IAM, SRI) having a first portion including a calling number (MS-ISDN) of a called mobile subscriber (MS) and a second portion including information about the type of call requested from the subscriber to a switching means (PABX, CPE, O-EX, T-EX) of the fixed network; and b) transferring (S3, S4, S5) said call set-up request (IAM, SRI) from said fixed network switching means to a switching means (GMSC, HLR, VMSC/VLR, MSC) of the mobile radio communication network via a network interface (NI, ISUP); and c) comparing a content of said second portion of said call set-up request (SRI) having been transferred to the mobile radio communication network switching means with a number of bearer capability contours (BCC11–BCCN1; BBC12–BCCN2) predefined for each subscriber of the mobile radio communication network and respectively representing a specific service supported by the mobile radio communication network for handling the different types of calls; and d) selecting a predefined bearer capability con tour which provides a best match to said content of said second portion; and e) composing a final mobile bearer capability ($BC_F$) from said content of said transferred second portion and said best match selected predefined bearer capability contour; and f) allocating bearer capabilities (BC) in the mobile radio communication network in accordance with said final mobile bearer capability ($BC_F$); and g) setting-up said call requested by said call set-up request to said mobile subscriber (MS) using said calling number of the mobile subscriber (MS-ISDN) and said allocated bearer capabilities, wherein said call originating subscriber is a mobile subscriber (MS5-MS8) of another mobile radio communication network (PLMN-B) and said call is set-up between said mobile subscriber of said another mobile radio communication network (PLMN-B) and said mobile subscriber of said mobile radio communication network (PLMN-A) through said fixed network, and wherein for the radio mobile communication network (PLMN-A) and said another mobile radio communication network (PLMN-B) a network selected from the group consisting of a D1 and D2 network is used.

Furthermore, this object is solved by a switching means (MNSW-A; GMSC, HLR, VMSC/VLR, MSC) of a mobile radio communication network (PSTN-A) having connected thereto a fixed network (FN, PSTN, ISDN, PSPDN) via a network interface (NI, ISUP) for setting-up calls of different types between a call originating subscriber (SS1–SS4; MS1–MS8) and a mobile station (MS) of the mobile radio communication network, comprising:

a) a reception means (GMSC, HLR) for receiving a call set-up request (IAM, SRI) having a first portion including a calling number (MS-ISDN) of a called mobile subscriber (MS) and a second portion including information about the type of call requested from said subscriber transmitted from a switching means (PABX, CPE, O-EX, T-EX) of the fixed network; and b) a contour storage means (CM) for storing for each subscriber (MS1–MS4) of the mobile radio communication network a number of predefined bearer capability contours (BCC1, BCC2, BCCN) indicating services supported by the mobile radio communication network for handling said different type of calls; and c) a contour selection means (CSM) for comparing a content of said second portion of said received call set-up request (SRI) with said predefined bearer capability contours and for selecting a predefined bearer capability contour which provides a best match to said content of said second portion; and d) an assembly means (AM) for composing a final mobile bearer capability ($BC_F$) from said contents of said received second portion (BC2) and said best match selected predefined bearer capability contour; and e) a setting-up means (HLR, VMSC/VLR, MSC) for allocating bearer capabilities (BC) in the mobile radio communication network in accordance with said final mobile bearer capability ($BC_F$) and for setting-up said requested call to the mobile subscriber (MS) using said calling number (MS-ISDN) and said allocated bearer capabilities (BCi).

The object is also solved by a switching means (MNSW-A; GMSC, HLR, VMSC/VLR, MSC) of a mobile radio communication network (PSTN-A) having connected thereto a fixed network (FN, PSTN, ISDN, PSPDN) via a network interface (NI, ISUP) for setting-up calls of different types between a call originating subscriber (SS1–SS4; MS1–MS8) and a mobile station (MS) of the mobile radio communication network, comprising:

a) a reception means (GMSC, HLR) for receiving a call set-up request (IAM, SRI) having a first portion including a calling number (MS-ISDN) of a called mobile subscriber (MS) and a second portion including information about the type of call requested from said subscriber transmitted from a switching means (PABX, CPE, O-EX, TEX) of the fixed network; and b) a contour storage means (CM) for storing for each subscriber (MS1–MS4) of the mobile radio communication network a number of predefined bearer capability contours (BCC1, BCC2, BCCN) indicating services supported by the mobile radio communication network for handling said different type of calls; and c) a contour selection means (CSM) for comparing a content of said second portion of said received call set-up request (SRI) with said predefined bearer capability contours and for selecting a predefined bearer capability contour which provides a best match to said content of said second portion; and d) an assembly means (AM) for composing a final mobile bearer capability ($BC_F$) from said contents of said received second portion (BC2) and said best match selected predefined bearer capability contour; and e) a setting-up means (HLR, VMSC/VLR, MSC) for allocating bearer capabilities (BC) in the mobile radio communication network in accordance with said final mobile bearer capability ($BC_F$) and for setting-up said requested call to the mobile subscriber (MS) using said calling number (MS-ISDN) and said allocated bearer capabilities (BCi), wherein said call originating subscriber is a mobile subscriber (MS5–MS8) of another mobile radio communication network (PLMN-B) and said call is set-up between said mobile subscriber of said another mobile radio communication network (PLMN-B) and the mobile subscriber of the mobile radio communication network (PLMN-A) through said fixed network (FN), and wherein the radio mobile communication network (PLMN-A) and said another mobile radio communication network (PLMN-B) are at least one selected from the group consisting of a D2 and D1 network.

This object is also solved by a communication system consisting of a fixed network (PSTN, ISDN, FN) and a mobile radio communication network (GMSC, HLR, VMSC/VLR, MSC, PLMN-A) serving a number of mobile subscribers (MS1–MS4), the networks (FN, PLMN-A) being interconnected via a network interface (NI, ISUP), comprising:

a) the fixed network including a fixed network switching means (PABX, CPE, O-EX, T-EX) for receiving a call setup request (IAM, SRI) from a call originating subscriber (SS1–SS4; MS1–MS8), said call set-up request having a first portion including a calling number (MS-ISDN) of a called mobile subscriber (MS) and a second portion including information about the type of call requested; and b) the mobile communication network comprising:

b1) a mobile radio communication network (PLMN-A) switching means (GMSC, HLR, VMSC/VLR, MSC) for receiving the call set-up request transferred from the fixed network switching means via said network interface; and b2) a contour storage means (CM) for storing for each subscriber (MS1–MS4) of said mobile radio communication network (PLMN-A) a number of predefined bearer capability contours (BCC1, BCC2, BCCN) indicating services supported by the mobile communication network for handling said different types of calls; and b3) a contour selection means (CSM) for comparing a content of said second portion of said received call set-up request (SRI) with said predefined bearer capability contours and for selecting a predefined bearer capability contour which provides a best match to said content of said second portion; and b4) an assembly means (AM) for composing a final mobile bearer capability ($BC_F$) from said contents of said received second portion (BC2) and said best match selected predefined bearer capability contour; and b5) a setting-up means (HLR, VMSC/VLR , MSC) for allocating bearer capabilities (BC) in the mobile radio communication network (PLMN-B) in accordance with said final mobile bearer capability ($BC_F$) and for setting-up said requested call to the mobile subscriber (MS) using said calling number (MS-ISDN) and said allocated bearer capabilities (Bci).

The object is also solved by a communication system consisting of a fixed network (PSTN, ISDN, FN) and a mobile radio communication network (GMSC, HLR, VMSC/VLR, MSC, PLMN-A) serving a number of mobile subscribers (MS1–MS4), the networks (FN, PLMN-A) being interconnected via a network interface (NI, ISUP), comprising:

a) the fixed network including a fixed network switching means (PABX, CPE, O-EX, T-EX) for receiving a call set-up request (IAM, SRI) from a call originating subscriber (SS1–SS4; MS1–MS8), said call set-up request having a first portion including a calling number (MS-ISDN) of a called mobile subscriber (MS) and a second portion including information about the type of call requested; and b) the mobile communication network comprising:

b1) a mobile radio communication network (PLMN-A) switching means (GMSC, HLR, VMSC/VLR, MSC) for receiving the call set-up request transferred from the fixed network switching means via said network interface; and b2) a contour storage means (CM) for storing for each subscriber (MS1–MS4) of said mobile radio communication network (PLMN-A) a number of predefined bearer capability contours (BCC1, BCC2, BCCN) indicating services supported by the mobile communication network for handling said different types of calls; and b3) a contour selection means (CSM) for comparing a content of said second portion of said received call set-up request (SRI) with said predefined bearer capability contours and for selecting a predefined bearer capability contour which provides a best match to said content of said second portion; and b4) an assembly means (AM) for composing a final mobile bearer capability ($BC_F$) from said contents of said received second portion (BC2) and said best match selected predefined bearer capability contour; and b5) a setting-up means (HLR, VMSC/VLR, MSC) for allocating bearer capabilities (BC) in the mobile radio communication network (PLMN-B) in accordance with said final mobile bearer capability ($BC_F$) and for setting-up said requested call to the mobile subscriber (MS) using said calling number (MS-ISDN) and said allocated bearer capabilities (Bci), wherein said call originating subscriber is a mobile subscriber (MS5–MS8) of another mobile radio communication network (PLMN-B) and said call is set-up between said mobile subscriber of said another mobile radio communication network (PLMN-B) and said mobile subscriber of said mobile radio communication network (PLMN-A) through said fixed network (FN), and wherein the mobile radio communication network (PLMN-A) and said another mobile radio communication network (PLMN-B) are selected from the group consisting of a Global System for Mobile Communications GSM, such as a D1 network or a D2 network, a Digital Cellular System at 1800 MHz such a E-PLUS or a Personal Communication System PCS.

While the conventional solution use the multiple-numbering scheme using a plurality of MS-ISDN/bearer capability relationships on a one-to-one basis stored in the HLR to handle the different types of calls, when incomplete (ISDN-case) or no (PSTN-case) compatibility information is received from the ISDN/PSTN, the invention uses a method of analyzing compatibility information, even if it arrives incomplete. This incomplete compatibility information is matched against some prestored bearer capabilities to construct a proper mobile BC.

Thus, according to the invention, a single MS-ISDN for any type of basic service and received minimal compatibility information is used to reconstruct the proper mobile bearer capability. Only one MS-ISDN must be used and compatibility information—even if it is filtered through the network protocols—is not transmitted in vain and used to construct the final mobile bearer capability without the need for storing a plurality of MS-ISDNs in the HLR. This means, that even if the number of protocol interfaces from the originating ISDN-terminal to the PLMN may filter (i.e. not transfer) all the compatibility information transmitted by the call originating subscriber, the HLR can select the bearer capability which is most appropriate to even the filtered compatibility information. Thus, call releases at the time of set-up for incorrect type of call connections as well the extensive storing of multiple MS-ISDNs in the HLR are avoided.

The contour selection procedure of the invention is applicable to all three cases of A: communication set-up between fixed subscriber SS of FN & a mobile subscriber of PLMN-A, B: communication set-up between a mobile subscriber MS* of PLMN-A & a mobile station MS of PLMN-A and C: communication set-up between a mobile subscriber MS* of PLMN-B & a mobile subscriber MS of PLMN-A as illustrated in FIGS. 1, 2, 3a.

Further advantageous embodiments and improvements of the invention may be taken from the dependent claims. Hereinafter, advantageous and illustrative embodiments of the invention will be described with reference to the attached drawings.

4. BRIEF DESCRIPTION OF THE DRAWINGS

FIG. 4b is a diagram showing the format of the transferred compatibility information in the call set-up request and the contents of the bearer capability contours used for the best match selection;

5. BEST MODE FOR CARRYING OUT THE INVENTION

Figure 1:
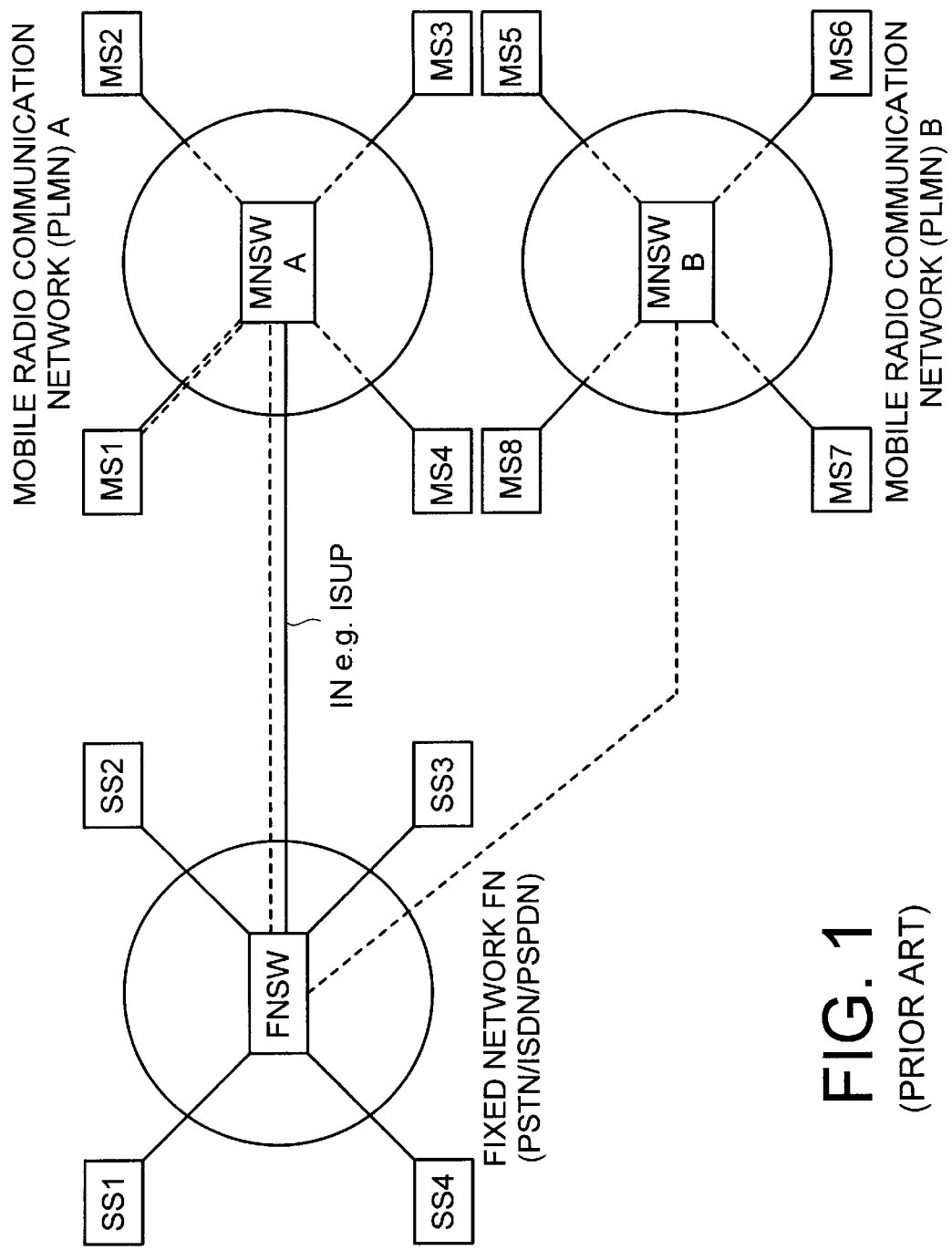
FIG. 1 shows a structure of a conventional communication system consisting of an interconnection of a fixed network FN and mobile radio communication networks PLMN-A, PLMN-B.
Figure 2:
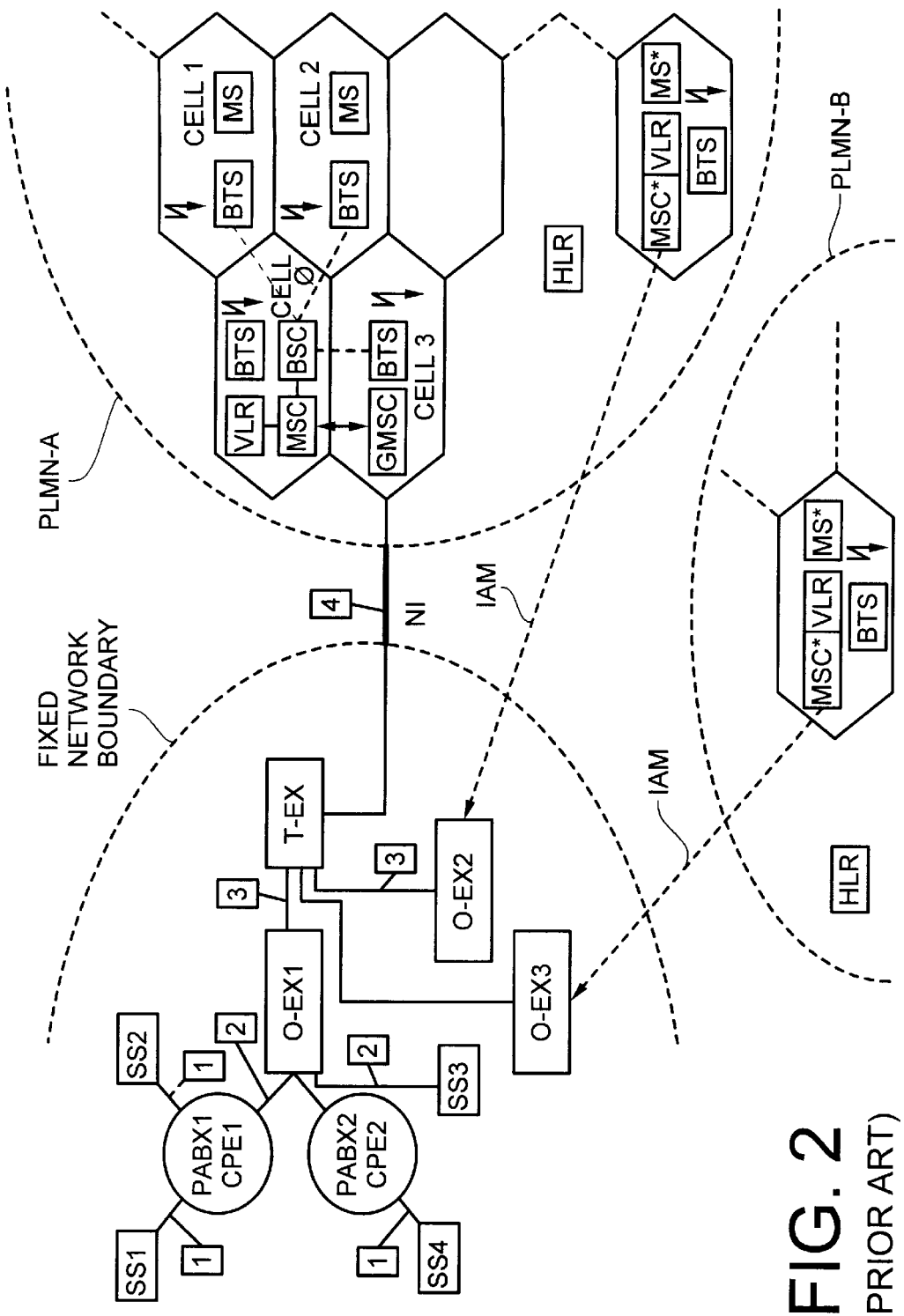
FIG. 2 shows an internal structure of the fixed network FN and the public land mobile networks PLMN-A, PLMN-B of the communication system of FIG. 1.
Figure 3A:
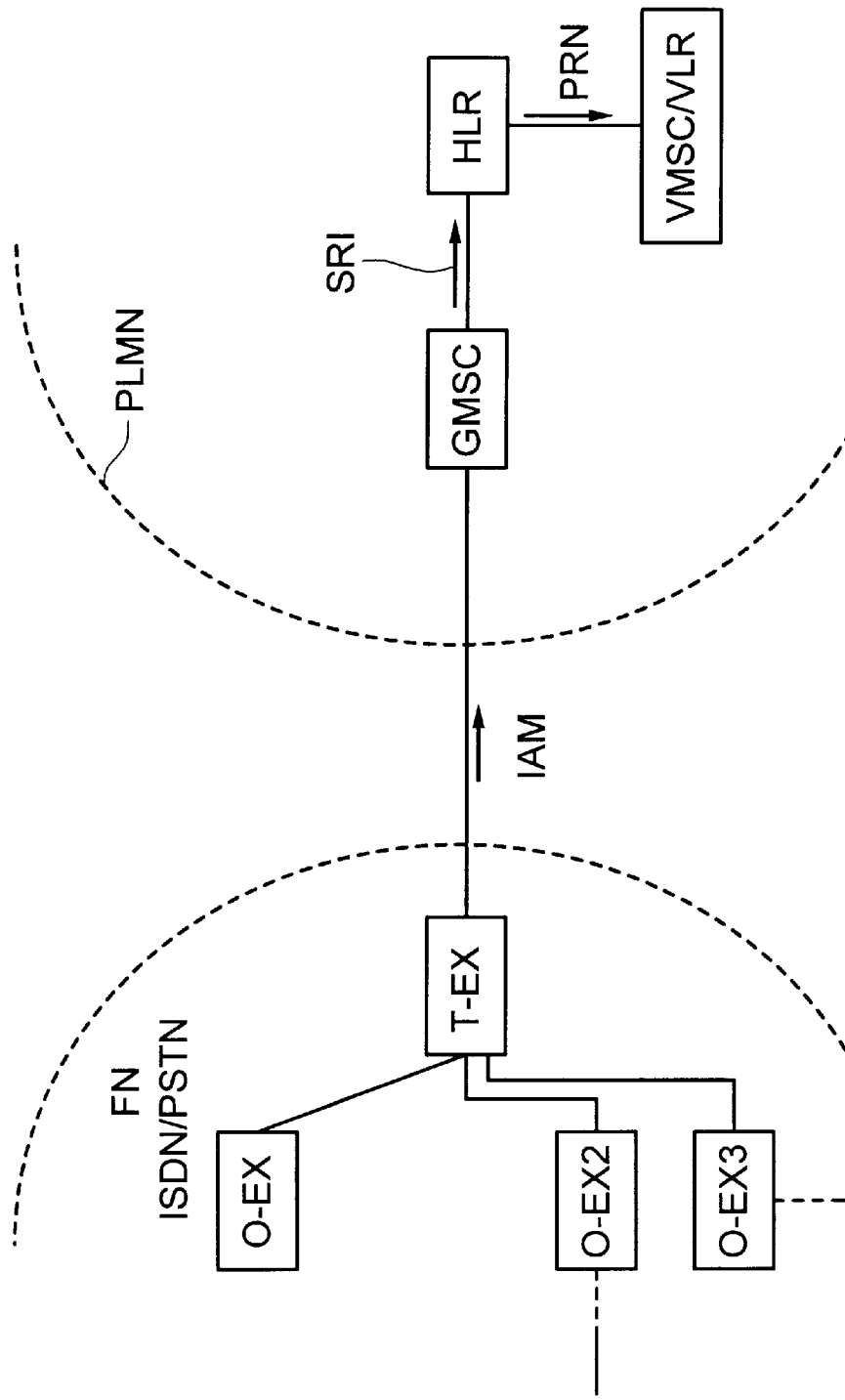
FIGS. 3a, 3b, 3c are diagrams for illustrating the setting-up of calls of different types using a conventional multiple-numbering scheme.
Figure 3B:
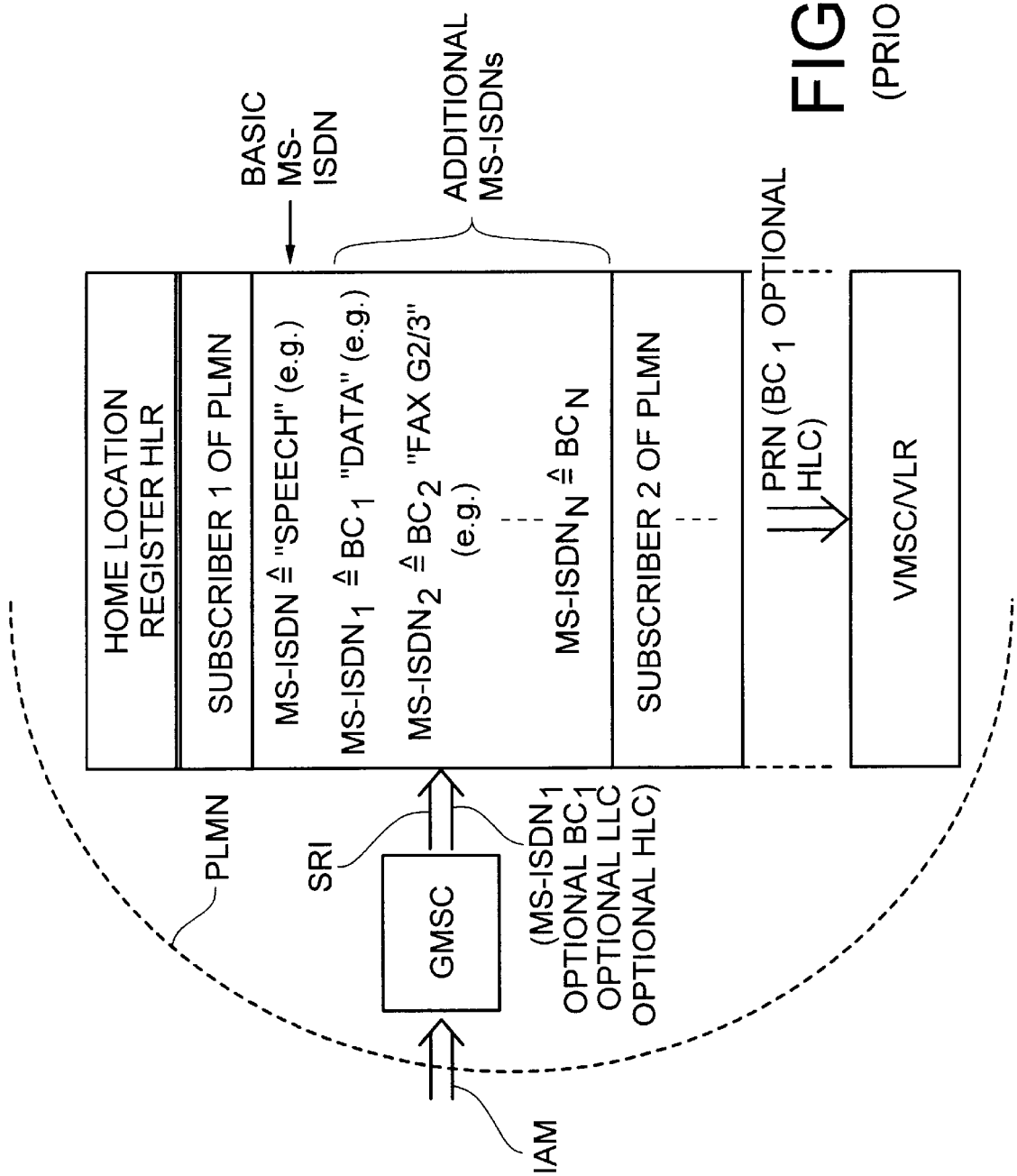
Figure 3C:
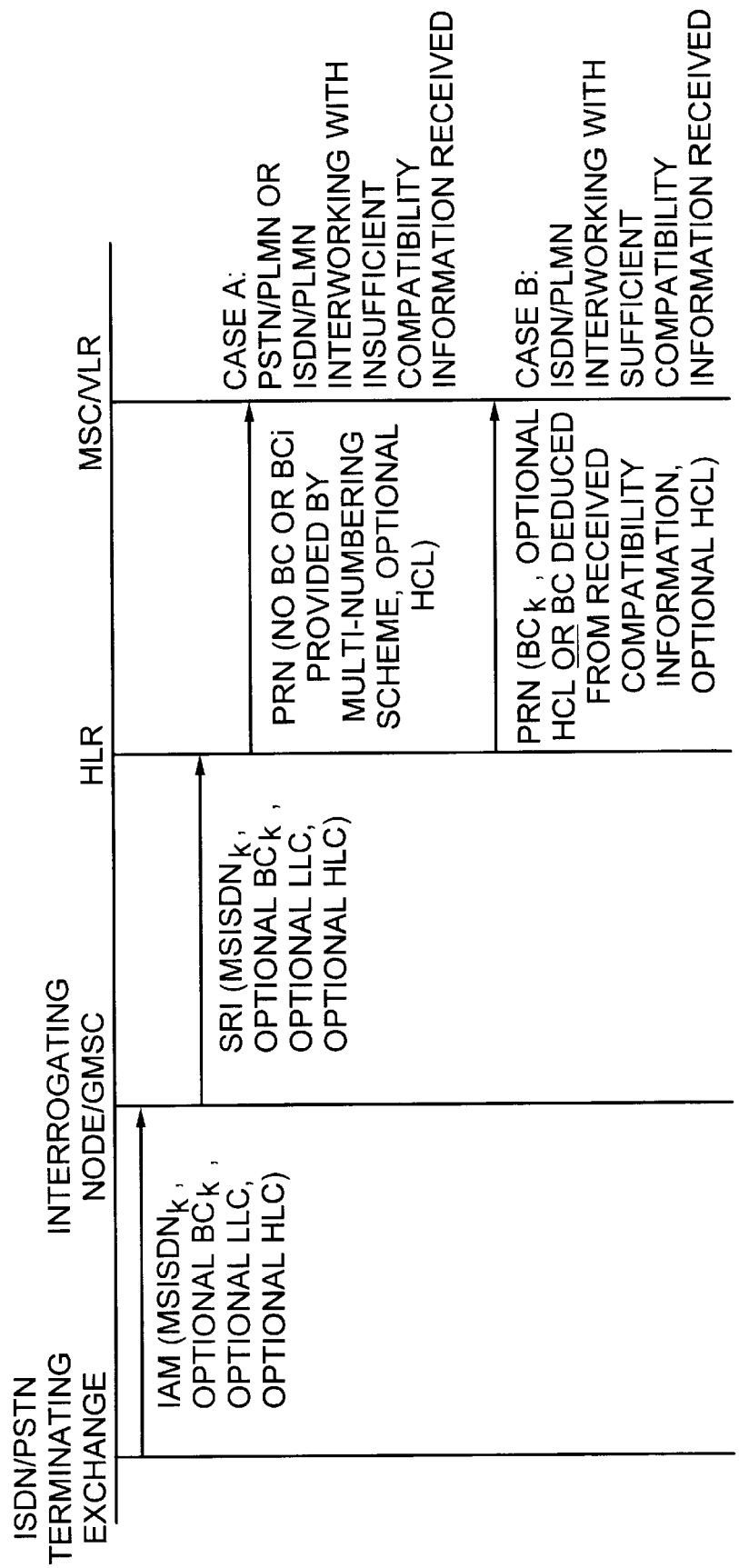

In the following description, the same reference numerals as in FIG. 1 to 3 are used to identify the same or corresponding elements.

Figure 4A:
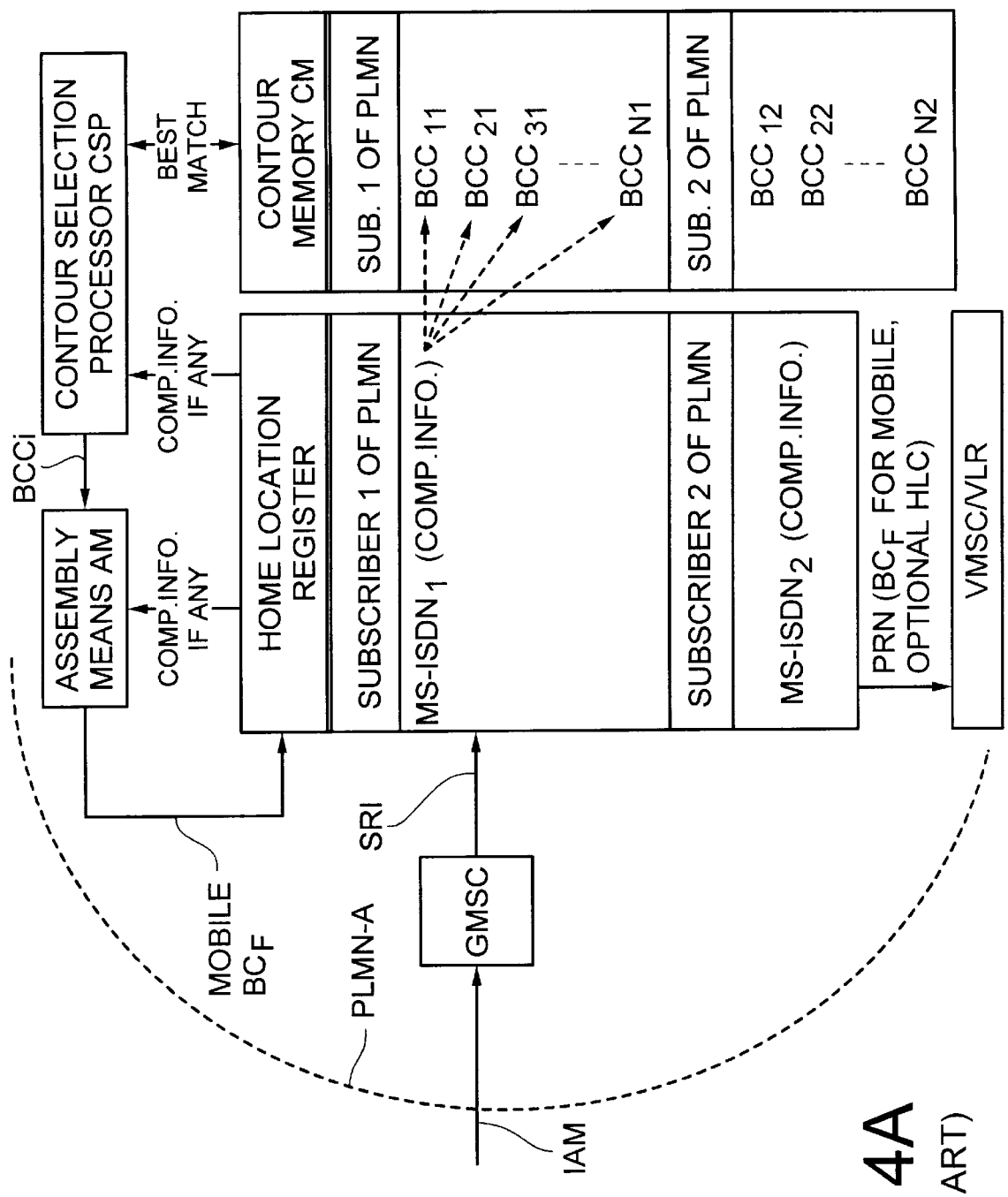
FIG. 4a shows a principle diagram of a mobile radio communication network switching means according to the invention.

Referring to FIG. 4a, an embodiment of a communication system according to the invention is shown, that uses a switching means according to one embodiment of the invention in the mobile radio communication system PLMN-A, which is schematically indicated with dashed lines in the figure. As can be seen by way of comparison with FIG. 3a, as regards the transfer of messages IAM, SRI and PRN, the system shown in FIG. 4a is identical to the one shown in FIG. 3a. That is, as was described with respect to FIG. 3b, the task of this switching means is to eventually provide a provide roaming number message PRN to a visitor location register VMSC/VLR in response to receiving an initial address message IAM from the fixed network (i.e. the terminating exchange T-EX in FIG. 2). It should be noted that the IAM may be a result of a mobile terminating call MTC originated by a fixed subscriber of the fixed network (case A discussed above), by a mobile station MS* of PLMN-A (case B discussed above) or by a mobile station MS* of PLMN-B (case C discussed above). Therefore, the following description equally applies to all cases A, B, C. As is seen in FIG. 4a (and in steps S9, S10 in FIG. 5), the provide roaming number message PRN contains a final mobile bearer capability (mobile $BC_F$) that indicates the bearer capabilities, which are necessary in the PLMN-A to support the type of call which is originated by the call originating subscriber.

Figure 5:
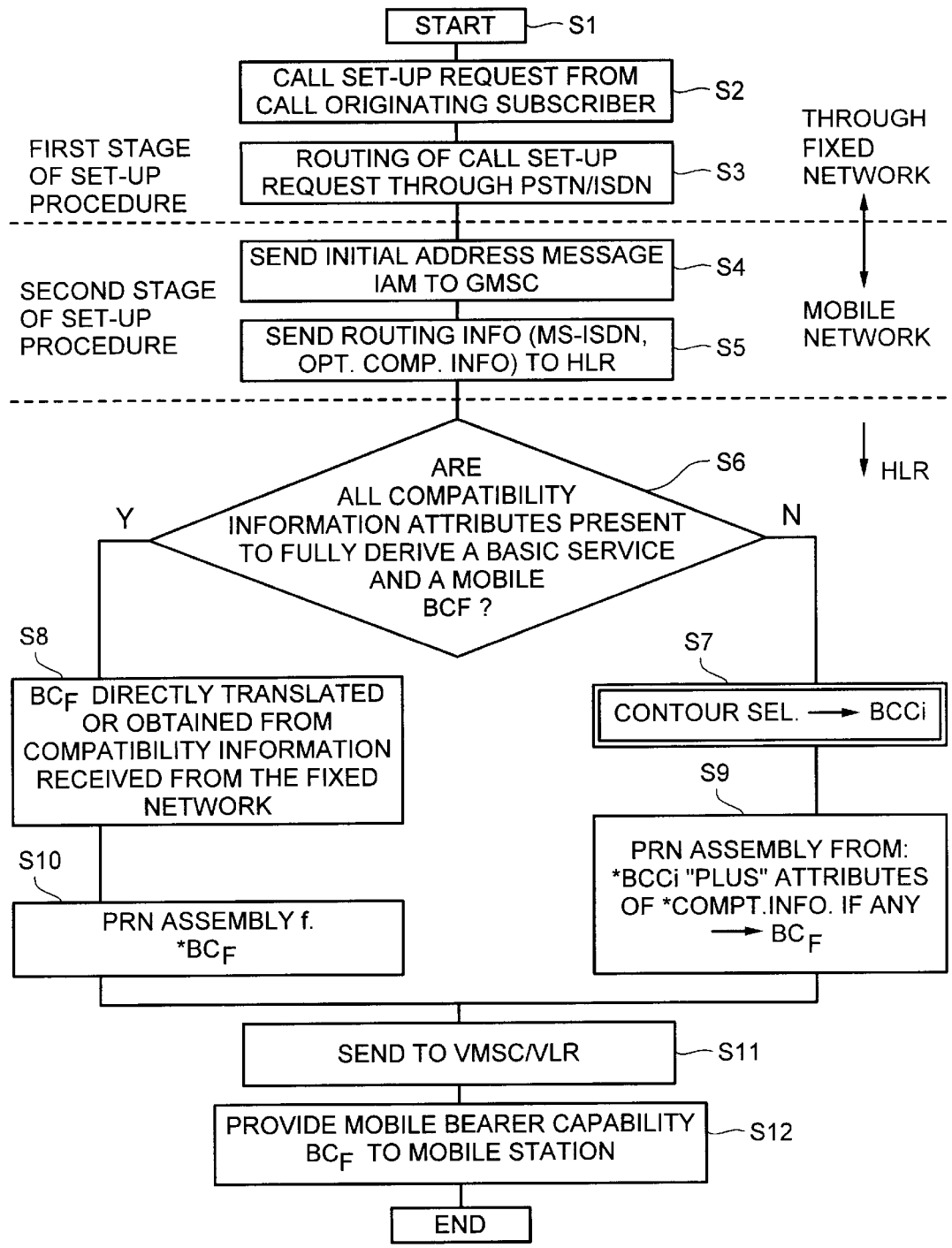
FIG. 5 shows the call set-up procedure.
Figure 6:
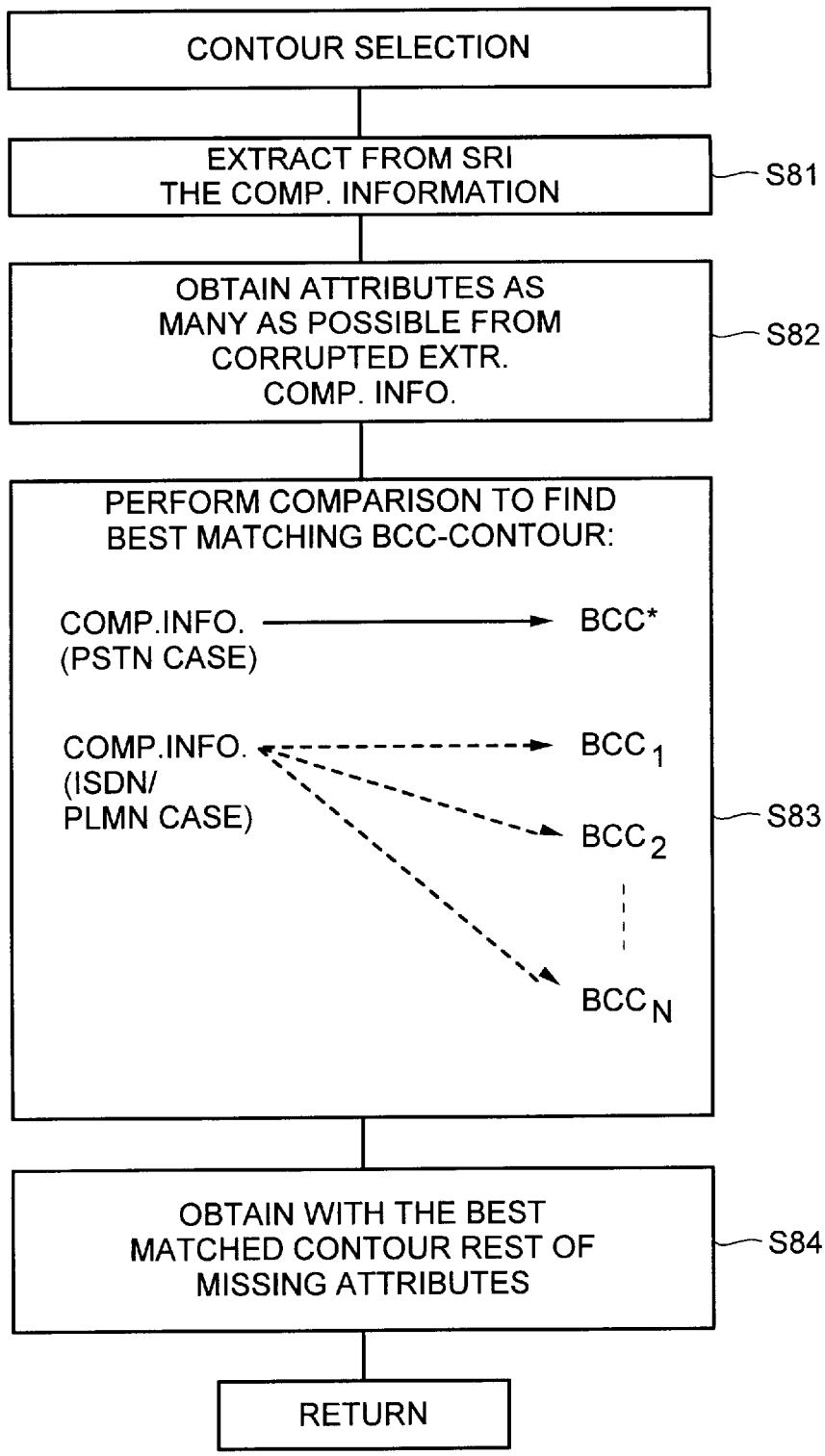
FIG. 6 shows a flowchart for the contour selection using the HLR of FIG. 4a for illustrating an embodiment of the method according to the invention.

As will be described in the following in more detail, there are three different ways how this mobile $BC_F$ is generated, if the call originating subscriber is a subscriber of the fixed network: firstly, if the fixed network is a PSTN, then no compatibility information is transferred by the call originating subscriber and only the calling MS-ISDN is used in a multiple-numbering scheme in order to determine the required bearer capabilities. Although no compatibility information is transferred, some attributes for a basic service supporting speech are derived from one specific contour BCC* as indicated in step S83 in FIG. 6; secondly, if the compatibility information is fully transmitted through the various protocols and arrives unfiltered (despite this being a rare case), then the mobile $BC_F$ is generated directly from the compatibility information (step S8 in FIG. 5); and thirdly, if compatibility information is filtered, then the mobile $BC_F$ is generated through a contour selection process as is shown in FIGS. 5, 6, wherein the second and third possibilities are carried out by only using a single MS-ISDN.

It may, however, be noted that any other parameters like the transmission medium requirement TRM or the calling party's category (reference [7]: Specifications of Signalling System No. 7, Recommendations Q721–Q766; CCIT (International Telecommunication Union); Geneva 1989, pages 221, 238, 239) can be used additionally as supplement or instead of the compatibility information and if so, the contour selection process is carried out likewise with such information.

As can be seen, the second and third approach comprise one important common feature in that the HLR in the PLMN-A will always generate a mobile bearer capability as opposed to expect for one, in the call confirmed message, from the mobile station at a later phase of the call set-up. This is intrinsically different from a GSM single numbering scheme, since in the GSM single numbering scheme, the HLR still has to expect for a necessary mobile bearer capability to be returned from the VLR and the mobile station, respectively.

As is seen in FIG. 4a, a reception means, which is constituted by the gateway mobile services switching center GMSC and the home location register HLR, receives a call set-up request (i.e. the initial address message IAM) from the fixed network. With the exception of the case of PSTN, this transferred set-up request will have again a first portion including the calling number MS-ISDN and a second portion including original compatibility information or compatibility information having been filtered through the transfer process by the used protocols. A contour memory CM is provided, that stores a number of bearer capability contours $BCC_{11}$–$BCC_{N1}$; $BCC_{12}$–$BCCN_2$ separately for each subscriber of the PLMN-A.

A contour selection means CSP is provided, that extracts compatibility information from the sent routing information SRI and compares this compatibility information with the bearer capability contours BCC stored in the contour memory, in order to find the very bearer capability contour, which provides best agreement with the extracted compatibility information. The bearer capability contour BCC providing the best agreement is selected as the bearer capability, from which the mobile bearer capability $BC_F$ is constructed. This selection and comparing characteristic is indicated in FIG. 4a with the dashed lines between the home location register HLR and the contour memory CM.

An assembly means AM is provided, that receives the compatibility information from the home location register HLR and the bearer capability contour BCCi from the contour selection processor CSP. The assembly means AM assembles the mobile bearer capability $BC_F$ directly from the compatibility information, if the compatibility information has been fully transmitted and not filtered through the network protocols (despite this being a rare case, since normally the network protocols used will filter the compatibility information). In case, that the compatibility information arrives filtered, i.e. when no direct match to a predefined bearer capability is existent, then the assembly means AM assembles the mobile bearer capability $BC_F$ from the incoming compatibility information "plus" the selected best match bearer capability contour BCCi.

As explained above, the call set-up request or the IAM or SRI contain a first portion with the MS-ISDN and a second portion with the compatibility information. The second portion with the compatibility information can be visualized as a bit pattern, which specifies the requested bearer capabilities needed to support (in the PLMN-A) the specific type of call requested by the fixed subscriber. To illustrate this, FIG. 4b shows the contents of the transferred second portion with the compatibility information/requested bearer capability (FIG. 4b is taken from page 65 of the afore-mentioned reference [3]; regarding the mobile bearer capability format reference is made to pages 40 to 42 of the aforementioned reference [2]). As can be seen from FIG. 4b, the bits of the individual parts of the transferred second portion indicate technical characteristics of the type of call requested from the fixed subscriber, such as coding standard, transfer mode, information transfer rate, rate multiplier, duplex mode, modem type, etc. As explained above, part of this bearer capability arrives filtered at the HLR, since individual bits of the transferred compatibility information are destroyed via the transfer through the various network protocols.

Then, the contour memory stores a plurality of bit patterns, which each specify a particular bearer capability with its particular attributes in a non-filtered way. These respective bit patterns are called the bearer capability contours BCC. The contour selection processor CSP compares the received compatibility information bit pattern with the plurality of stored bearer capability contour bit patterns, in order to determine the bearer capability contour bit pattern, which best coincides with the received compatibility information bit pattern. Thus, even if filtered compatibility information bit patterns arrive, the contour selection processor CSP performs a regeneration of corrupted bits, since only specific combinations of the individual bits indicate the correct bearer capability needed to support in the PLMN-A the specific type of call made by the subscriber. One specific bearer capability contour BCC* relates to a PSTN connection, where no compatibility information is received. The remaining BCCs are related to ISDN-connections, when insufficient compatibility information is received to derive the basic service.

Thus, if filtered compatibility information is received from the fixed network, then the assembly means AM assembles the mobile bearer capability $BC_F$ from the incoming compatibility information "plus" the selected best match bearer capability contour BCCi.

If compatibility information is non-filtered, then the assembly means AM can directly derive the mobile bearer capability $BC_F$ from the received compatibility information. The contour memory, the contour selection processor and the assembly means can be part of the home location register HLR, despite they are shown separately for illustration purposes in FIG. 4a. Viewing the GMSC and such a home location register HLR generally as a switching means of the PLMN, the embodiment of a communication system incorporating such a switching means achieves the following advantages:

i) each subscriber to the fixed ISDN-network (or in fact any other mobile subscriber originating a call through the fixed network, see FIG. 1) only needs to use a single MS-ISDN and compatibility information by contrast to remembering a plurality of MS-ISDNs in the multiple-numbering scheme for requesting various types of bearer capabilities, which are necessary to support the specific type of call desired by the subscriber to the fixed network;

ii) the home location register HLR does not have to store numerous MS-ISDN/bearer capability BC pairs for each PLMN-subscriber; i.e. the home location register HLR must only store a plurality of bearer capability contours, which are provided simultaneously for all subscribers of the mobile network;

iii) if filtered compatibility information has been received, the compatibility information was not transmitted in vain, since information that has been filtered in the course of the transfer via the network protocols is regenerated, such that the received filtered compatibility information is augmented with correct bits from the bearer capability contours;

iv) the selected final mobile $BC_F$ is always the final correct bearer capability needed to support the specific type of call, such that no calls will fail;

v) the HLR itself will generate the correct mobile $BC_F$ to be forwarded to the VMSC/VLR (and hence to the mobile station MS) rather than expecting the mobile station MS to provide a bearer capability $BC_F$ in a call confirmed message at a later phase of the call-set-up.

With reference to FIG. 5, 6 an embodiment of the inventive method for setting-up calls of different types between a call originating subscriber and a mobile subscriber of the mobile radio communication network PLMN-A using bearer capability contour selection will be explained. In steps S1, S2, S3 the first stage of the set-up procedure is carried out. A network protocol is run to support the exchange of signalling information between the HLR and the call originating subscriber.

In a call set-up request the fixed subscriber (or in fact a mobile subscriber when originating a call through the fixed network, see FIG. 1) specifies the MS-ISDN of the called mobile subscriber and—if the fixed network is a digital ISDN-network or a similar digital network—compatibility information regarding the requested bearer services and teleservices needed in the PLMN-A for the specific type of call, which the call originating subscriber has requested.

After steps S4, S5 the HLR receives the send routing information message SRI including the MS-ISDN and the compatibility information (in the case of the ISDN-network)

In step S6 the HLR checks, whether compatibility information is sufficient to derive a bearer capability. That is, the HLR checks, whether the attributes of the compatibility information are sufficient to fully derive a basic service and a mobile $BC_F$. The check in step S6 is two-fold: first a so-called subscriber check is performed, in which it is checked, whether the called subscriber of PLMN-A has subscribed to a specific bearer service requested, i.e. whether such bearer services are available for the called subscriber in the PLMN-A. If not, the call is released. If yes, it is checked whether the attributes for the requested service are fully derivable from the received compatibility information to derive the mobile $BC_F$. If the answer is again yes, then the assembly means AM will compose in step S8 the mobile $BC_F$ directly from the compatibility information received from the fixed network FN. In steps S10, S11 the provide roaming number message PRN with the so derived mobile bearer capability $BC_F$ is sent to the VMSC/VLR, which in turn provides the bearer capabilities to the mobile station in step S12 as a setting-up means.

When in step S6 the HLR detects, that the transferred compatibility information is insufficient to fully derive a basic service and a mobile $BC_F$ (or if no compatibility information whatsoever is received), then the contour selection processor CSP and the assembly means AM in step S7 perform the contour selection subprogram, that is shown in FIG. 6. The HLR performs the test in step S7 by checking, whether enough attributes are provided, that in common allow to specify a bearer service, that is known in the PLMN-A.

After extracting compatibility information from the second portion of the send routing information message SRI in step S81, the contour selection processor in step S82 first extracts as many attributes as possible from the filtered existent compatibility information. This means, that the contour selection processor regards those parts of the compatibility information bit patterns as correct, from which attributes can be fully and readily derived. Due to the filtering some attributes can, however, not be derived and these are generated by the contour selection in step S83. In step S83 the matching of the received compatibility information bit pattern to the prestored bearer capability contour bit patterns is performed and the very bearer capability contour BCCi providing a best match to the received bit pattern is selected as the bearer capability contour to be used for composing the mobile $BC_F$.

Having determined the best match BCCi, in step S84 the assembly means AM determines the missing attributes, that could not be derived on the basis of the originally received compatibility information. If no attributes can be derived in step S82, then the call was obviously made by a subscriber of a PSTN network. In this case, the HLR will in step S83 assign a preset bearer capability BCC*, since it must be a PSTN-call without compatibility information. This presetting includes the possibility to use the multiple-numbering scheme in this case. Appropriate attributes are thus derived in step S82 also for the case of the PSTN-made call.

It may, however, be noted that any other parameters like the transmission medium requirement TRM or the calling party's category can be used additionally as supplement or instead of the compatibility information and if so, then the contour selection process is carried out likewise with such information. That is, only when no compatibility information and no other incoming information is received, the default setting BCC* is selected.

Then, in step S9, the mobile $BC_F$ is composed from the incoming compatibility information attributes "plus" the missing bearer capability attributes regenerated on the basis of the best match bearer capability contour BCCi. This "plus" connection in step S9 can have several possibilities. The final bearer capability $BC_F$ may be assembled just by arranging all attributes that could be directly obtained from the compatibility information and that were regenerated on the basis of the contour selection process, together in the $BC_F$ field of the PRN. However, it can also mean that a kind of logic is used that evaluates the attributes and changes them in accordance with the called subscriber subscription. For example, the call originating subscriber may have desired a call with a specific transmission rate of say 4800 baud and this was derived as attribute in step S7. However, the called subscriber subscription may only extend to 2400 baud for the specific type of call requested. Then the "plus"-connection may contain a logic that resets this attribute to 2400 baud before it is assembled in the PRN.

On the basis of the composed mobile $BC_F$ the home location register HLR assembles the PRN in step S11 from the MS-ISDN and the $BC_F$. Again the PRN is then sent to the VMSC/VLR, which in turn provides the mobile $BC_F$ to the mobile station in step S12. Thus, the setting-up of a call of a specific type can be made by providing to the VLR already the appropriate bearer capabilities, which are necessary to support the specific type of call.

As described above, if incomplete bearer capability information is received by the HLR and no bearer service or teleservice can be derived, the received compatibility information is nonetheless used to select a predefined BCCI. The matching selection does not depend on different MS-ISDNs like in the conventional multiple-numbering scheme, but rather on the incoming compatibility information. The contour selection searches for the ISDN network incoming compatibility information to match against a BC contour and with the matching relationship the HLR selects a BCCi and derives a bearer service or teleservice, completing the missing bearer capability attributes from the BCCi. Thus, the HLR constructs from "pieces" a mobile $BC_F$ using the minimal incoming fixed network compatibility information augmented by the bearer capability contour characteristics provided by the contour selection. This approach decreases the risk of releasing the incoming call during call set-up and call establishment or granting the set-up of an erroneous ISDN call request.

These points may be appreciated by considering the following contrasting case utilizing the conventional PLMN multi-numbering scheme. The ISDN interfaces for the example are depicted in FIG. 1, 2:

An ISDN terminal SS1 signals a request to establish an unrestricted digital data call (UDI) to a mobile subscriber associated with mobile station MS1. There are a number of interfaces involved:

1. between the ISDN terminal and the Customer Premises Equipment (CPE); e.g. a PABX;
2. between the PABX and the originating ISDN exchange of the public network. This interface is a standardized access protocol; e.g. DSS1 or a National digital access protocol;

3. between the originating ISDN and the terminating ISDN/PSTN exchange. This interface is an ISUP, a National User Part, or an analog signalling protocol;

4. between the terminating ISDN/PSTN exchange and the interrogating node or GMSC in the PLMN. This interface is an ISUP, National User Part, or an analog signalling protocol.

Each of these four interfaces or a combination of them, depending on their limitations, may not transport the complete compatibility information required by the PLMN network to derive a proper bearer service or teleservice for a mobile terminating call.

The national access protocol (interface ②, in FIG. 1,2) filters out characteristics of the bearer capability, except for instance the information transfer capability ITC. The ITC is the minimum semantic information transported in the access protocol and ISUP or National User Part signalling protocols. Recognizing that it is also the minimum information required by the PLMN to deduce a basic service group, the contour selection would be the natural choice for the HLR to perform. After the national access protocol signalling, the bearer capability's ITC is further transported in the ISUP or National User Part protocols, to the interrogating node or GMSC. Because the HLR does not receive all call characteristics in the compatibility information, it invokes the constrained multiple-numbering scheme, but by not doing a contour selection, an improper pre-stored bearer capability is selected, see FIG. 3b. Mobile operators normally assign a 3.1 KHz service to the additional MSISDNs in the multiple-numbering scheme for data calls. This is done to support PLMN to PSTN interworking requirements to use additional MSISDNs; i.e. 3.1 KHz calls.

Thus, the ISDN terminal in this case, pursuing to establish an UDI data call to the mobile subscriber, is granted a 3.1 KHz data bearer service by the HLR, and subsequently by the VMSC/VLR. While the ISDN terminal, after call set-up, transmits digital user information, the MS and interworking function (IWF) in the PLMN, seize modem services and expect modem tones to handshake and exchange data. The call is bound to fail.

By using the approach shown in FIG. 4a, the contour selection successfully sets up the UDI data call requested by the call-originating subscriber and obtains the missing BC attributes from the selected BCC. This is performed independently if compatibility information was filtered out by any combination of the four interfaces described in FIG. 2.

It may be noted, that the above set out invention is not restricted to a specific type of PLMN or a specific type of fixed network. That is, the invention is applicable to all cases, where a digital fixed network is connected to a mobile radio communication network, which allows subscribers of the fixed network and the mobile stations of the mobile radio communication network to perform communications of various different types by requesting different bearer services or teleservices in the PLMN. Despite using a single-numbering scheme, the approach is also different from the GSM single numbering scheme, because the HLR in the PLMN will always have the capacity to generate a mobile bearer capability as opposed to expect for one, in the call confirmed message, from the mobile station MS at a later phase of the call set-up.

Whilst FIG. 4a, 4b to 6 were described for the call set-up request mode by a subscriber of the fixed network to communicate with a mobile station of PLMN-A, it should be noted that the same procedure is applicable to the case where a subscriber MS* of PLMN-A wants to communicate with a mobile station of PLMN-A, and to the case where a mobile station MS* of PLMN-B wants to communicate with a mobile station of PLMN-A. As is indicated in FIG. 1, 2, in the two latter cases, the respective MSC* behave as PABXs and send messages for call set-up that are understood by the respective originating exchanges O-EX2, O-EX3. However, again the GMSC will receive an initial address message IAM with an MS-ISDN and compatibility information just like in the case of the fixed subscriber SS1–SS4 originating the call. Thus, the switching means of PLMN-A performs the same kind of mobile bearer capability $BC_F$ generation on the basis of an IAM, only that the IAM is a result of a mobile station MS* having made the call set-up request.

Reference numerals in the claims only serve clarification purposes and do not limit the scope of the attached claims.

We claim:

1. A method for setting-up calls of different types between a call originating subscriber (SS1–SS4; MS1–MS8) and a mobile subscriber (MS) of a mobile radio communication network (PLMN-A) having a fixed network (FN; ISDN, PSTN, PSPDN) connected thereto, comprising the following steps:

a) sending (S1, S2) a call set-up request (IAM, SRI) having a first portion including a calling number (MS-ISDN) of a called mobile subscriber (MS) and a second portion including information about the type of call requested from the subscriber to a switching means (PABX, CPE, O-EX, T-EX) of the fixed network; and b) transferring (S3, S4, S5) said call set-up request (IAM, SRI) from said fixed network switching means to a switching means (GMSC, HLR, VMSC/VLR, MSC) of the mobile radio communication network via a network interface (NI, ISUP); and c) comparing a content of said second portion of said call set-up request (SRI) having been transferred to the mobile radio communication network switching means with a number of bearer capability contours (BCC11–BCCN1; BBC12–BCCN2) predefined for each subscriber of the mobile radio communication network and respectively representing a specific service supported by the mobile radio communication network for handling the different types of calls; and d) selecting a predefined bearer capability contour which provides a best match to said content of said second portion; and e) composing a final mobile bearer capability ($BC_F$) from said content of said transferred second portion and said best match selected predefined bearer capability contour; and f) allocating bearer capabilities (BC) in the mobile radio communication network in accordance with said final mobile bearer capability ($BC_F$); and g) setting-up said call requested by said call set-up request to said mobile subscriber (MS) using said calling number of the mobile subscriber (MS-ISDN) and said allocated bearer capabilities.

2. A method according to claim 1, wherein
said call originating subscriber is a fixed subscriber (SS1–SS4) of the fixed network and said call is set-up between said fixed subscriber and said mobile subscriber (MS1–MS4) of the mobile radio communication network.

3. A method according to claim 1, wherein
said call originating subscriber is a mobile subscriber (MS1–MS4) of the mobile radio communication network and said call is set-up between said mobile subscriber of the mobile radio communication network and said mobile subscriber of the mobile radio communication network through the fixed network.

4. A method according to claim 1, wherein
said call originating subscriber is a mobile subscriber (MS5–MS8) of another mobile radio communication network (PLMN-B) and said call is set-up between said mobile subscriber of said another mobile radio communication network (PLMN-B) and said mobile subscriber of said mobile radio communication network (PLMN-A) through said fixed network.

5. A method according to claim 1, wherein
for the radio mobile communication network at least one network selected from the group consisting of a GSM- and a DCS- and a PCS-network is used.

6. A method for setting-up calls of different types between a call originating subscriber (SS1–SS4; MS1–MS8) and a mobile subscriber (MS) of a mobile radio communication network (PLMN-A) having a fixed network (FN; ISDN, PSTN, PSPDN) connected thereto, comprising the following steps:

a) sending (S1, S2) a call set-up request (IAM, SRI) having a first portion including a calling number (MS-ISDN) of a called mobile subscriber (MS) and a second portion including information about the type of call requested from the subscriber to a switching means (PABX, CPE, O-EX, T-EX) of the fixed network; and b) transferring (S3, S4, S5) said call set-up request (IAM, SRI) from said fixed network switching means to a switching means (GMSC, HLR, VMSC/VLR, MSC) of the mobile radio communication network via a network interface (NI, ISUP); and c) comparing a content of said second portion of said call set-up request (SRI) having been transferred to the mobile radio communication network switching means with a number of bearer capability contours (BCC11–BCCN1; BBC12–BCCN2) predefined for each subscriber of the mobile radio communication network and respectively representing a specific service supported by the mobile radio communication network for handling the different types of calls; and d) selecting a predefined bearer capability contour which provides a best match to said content of said second portion; and e) composing a final mobile bearer capability ($BC_F$) from said content of said transferred second portion and said best match selected predefined bearer capability contour; and f) allocating bearer capabilities (BC) in the mobile radio communication network in accordance with said final mobile bearer capability ($BC_F$); and g) setting-up said call requested by said call set-up request to said mobile subscriber (MS) using said calling number of the mobile subscriber (MS-ISDN) and said allocated bearer capabilities, wherein
said call originating subscriber is a mobile subscriber (MS5–MS8) of another mobile radio communication network (PLMN-B) and said call is set-up between said mobile subscriber of said another mobile radio communication network (PLMN-B) and said mobile subscriber of said mobile radio communication network (PLMN-A) through said fixed network, and wherein
for the radio mobile communication network (PLMN-A) and said another mobile radio communication network (PLMN-B) a network selected from the group consisting of a D1 and D2 network is used.

7. A method according to claim 1, wherein
as said information about the type of call compatibility information is send.

8. A method according to claim 1, wherein
in said step a) said call set-up request (IAM, SRI) is sent by said subscriber to an originating exchange (O-EX) of the fixed network switching means and in response thereto a terminating exchange (T-EX) connected to said originating exchange (O-EX) in said step b) sends an initial address message (IAM) to a gateway mobile switching center (GMSC) of the mobile radio communication network (PLMN), which in turn sends a corresponding send routing information message (SRI) to a home location register (HLR) of said mobile radio communication network (PLMN).

9. A method according to claim 8, wherein
said home location register (HLR) provides a provide roaming number request (PRN) to a visitor location register (VMSC/VLR), which in turn set-ups the requested call to the called mobile subscriber.

10. A method according to claim 8, wherein
as said information about the type of call compatibility information is send,
and wherein
said initial address message (IAM) and said send routing information message (SRI) respectively contain a mobile station ISDN number (MS-ISDN) and optionally said compatibility information (BC), if the fixed network is a digital network selected from the group consisting of an ISDN and a PSPDN.

11. A method according to claim 9, wherein
said provide roaming number request (PRN) contains a mobile station ISDN number (MS-ISDN) and a final mobile bearer capability ($BC_F$) directly translated from information contained in said second portion received from said fixed network, when said information is sufficient to fully derive a basic service and a mobile bearer capability.

12. A method according to claim 8, wherein
said initial address message (IAM) and said send routing information message (SRI) respectively contain a mobile station ISDN number (MS-ISDN) and no compatibility information (BC), when the fixed network (ISDN) is a PSTN network.

13. A switching means (MNSW-A; GMSC, HLR, VMSC/VLR, MSC) of a mobile radio communication network (PSTN-A) having connected thereto a fixed network (FN, PSTN, ISDN, PSPDN) via a network interface (NI, ISUP) for setting-up calls of different types between a call originating subscriber (SS1–SS4; MS1–MS8) and a mobile station (MS) of the mobile radio communication network, comprising:

a) a reception means (GMSC, HLR) for receiving a call set-up request (IAM, SRI) having a first portion including a calling number (MS-ISDN) of a called mobile subscriber (MS) and a second portion including information about the type of call requested from said subscriber transmitted from a switching means (PABX, CPE, O-EX, T-EX) of the fixed network; and b) a contour storage means (CM) for storing for each subscriber (MS1–MS4) of the mobile radio communication network a number of predefined bearer capability contours (BCC1, BCC2, BCCN) indicating services supported by the mobile radio communication network for handling said different type of calls; and c) a contour selection means (CSM) for comparing a content of said second portion of said received call set-up request (SRI) with said predefined bearer capability contours and for selecting a predefined bearer capability contour which provides a best match to said content of said second portion; and d) an assembly means (AM) for composing a final mobile bearer capability ($BC_F$) from said contents of said received second portion (BC2) and said best match selected predefined bearer capability contour; and e) a setting-up means (HLR, VMSC/VLR, MSC) for allocating bearer capabilities (BC) in the mobile radio communication network in accordance with said final mobile bearer capability ($BC_F$) and for setting-up said requested call to the mobile subscriber (MS) using said calling number (MS-ISDN) and said allocated bearer capabilities (BCi).

14. A switching means according to claim 13, wherein
said call originating subscriber is a fixed subscriber (SS1–SS4) of the fixed network and said call is set-up between the fixed subscriber and the mobile subscriber (MS1–MS4) of the mobile radio communication network.

15. A switching means according to claim 13, wherein
said call originating subscriber is a mobile subscriber (MS1–MS4) of the mobile radio communication network (PLMN-A) and said call is set-up between the mobile subscriber of the mobile radio communication network (PLMN-A) and the mobile subscriber of the mobile radio communication network (PLMN-A) through said fixed network (FN).

16. A switching means according to claim 13, wherein
said call originating subscriber is a mobile subscriber (MS5–MS8) of another mobile radio communication network (PLMN-B) and said call is set-up between said mobile subscriber of said another mobile radio communication network (PLMN-B) and the mobile subscriber of the mobile radio communication network (PLMN-A) through said fixed network (FN).

17. A switching means according to claim 13, wherein
the radio mobile communication network is at least one network selected from the group consisting of a GSM- and a DCS- and a PCS-network.

18. A switching means (MNSW-A; GMSC, HLR, VMSC/VLR, MSC) of a mobile radio communication network (PSTN-A) having connected thereto a fixed network (FN, PSTN, ISDN, PSPDN) via a network interface (NI, ISUP) for setting-up calls of different types between a call originating subscriber (SS1–SS4; MS1–MS8) and a mobile station (MS) of the mobile radio communication network, comprising:

a) a reception means (GMSC, HLR) for receiving a call set-up request (IAM, SRI) having a first portion including a calling number (MS-ISDN) of a called mobile subscriber (MS) and a second portion including information about the type of call requested from said subscriber transmitted from a switching means (PABX, CPE, O-EX, T-EX) of the fixed network; and b) a contour storage means (CM) for storing for each subscriber (MS1–MS4) of the mobile radio communication network a number of predefined bearer capability contours (BCC1, BCC2, BCCN) indicating services supported by the mobile radio communication network for handling said different type of calls; and c) a contour selection means (CSM) for comparing a content of said second portion of said received call set-up request (SRI) with said predefined bearer capability contours and for selecting a predefined bearer capability contour which provides a best match to said content of said second portion; and d) an assembly means (AM) for composing a final mobile bearer capability ($BC_F$) from said contents of said received second portion (BC2) and said best match selected predefined bearer capability contour; and e) a setting-up means (HLR, VMSC/VLR, MSC) for allocating bearer capabilities (BC) in the mobile radio communication network in accordance with said final mobile bearer capability ($BC_F$) and for setting-up said requested call to the mobile subscriber (MS) using said calling number (MS-ISDN) and said allocated bearer capabilities (BCi), wherein
said call originating subscriber is a mobile subscriber (MS5–MS8) of another mobile radio communication network (PLMN-B) and said call is set-up between said mobile subscriber of said another mobile radio communication network (PLMN-B) and the mobile subscriber of the mobile radio communication network (PLMN-A) through said fixed network (FN), and wherein
the radio mobile communication network (PLMN-A) and said another mobile radio communication network (PLMN-B) are at least one selected from the group consisting of a D2 and D1 network.

19. A switching means according to claim 13, wherein
said information about the type of call is a compatibility information.

20. A communication system consisting of a fixed network (PSTN, ISDN, FN) and a mobile radio communication network (GMSC, HLR, VMSC/VLR, MSC, PLMN-A) serving a number of mobile subscribers (MS1–MS4), the networks (FN, PLMN-A) being interconnected via a network interface (NI, ISUP), comprising:

a) the fixed network including a fixed network switching means (PABX, CPE, O-EX, T-EX) for receiving a call set-up request (IAM, SRI) from a call originating subscriber (SS1–SS4; MS1–MS8), said call set-up request having a first portion including a calling number (MS-ISDN) of a called mobile subscriber (MS) and a second portion including information about the type of call requested; and b) the mobile communication network comprising:
b1) a mobile radio communication network (PLMN-A) switching means (GMSC, HLR, VMSC/VLR, MSC) for receiving the call set-up request transferred from the fixed network switching means via said network interface; and b2) a contour storage means (CM) for storing for each subscriber (MS1–MS4) of said mobile radio communication network (PLMN-A) a number of predefined bearer capability contours (BCC1, BCC2, BCCN) indicating services supported by the mobile communication network for handling said different types of calls; and b3) a contour selection means (CSM) for comparing a content of said second portion of said received call set-up request (SRI) with said predefined bearer capability contours and for selecting a predefined bearer capability contour which provides a best match to said content of said second portion; and b4) an assembly means (AM) for composing a final mobile bearer capability ($BC_F$) from said contents of said received second portion (BC2) and said best match selected predefined bearer capability contour; and b5) a setting-up means (HLR, VMSC/VLR, MSC) for allocating bearer capabilities (BC) in the mobile radio communication network (PLMN-B) in accordance with said final mobile bearer capability ($BC_F$) and for setting-up said requested call to the mobile subscriber (MS) using said calling number (MS-ISDN) and said allocated bearer capabilities (Bci).

21. A communication system according to claim 20, wherein
the call originating subscriber is a fixed subscriber (SS1–SS4) of the fixed network (FN) and said call is set-up between the fixed subscriber and the mobile subscriber (MS1–MS4) of the mobile radio communication network (PLMN-A).

22. A communication system according to claim 20, wherein
said call originating subscriber is a mobile subscriber (MS1–MS4) of the mobile radio communication network (PLMN-A) and said call is set-up between said mobile subscriber of the mobile radio communication network (PLMN-A) and said mobile subscriber of said mobile radio communication network (PLMN-A) through said fixed network (FN).

23. A communication system according to claim 20, wherein
said call originating subscriber is a mobile subscriber (MS5–MS8) of another mobile radio communication network (PLMN-B) and said call is set-up between said mobile subscriber of said another mobile radio communication network (PLMN-B) and said mobile subscriber of said mobile radio communication network (PLMN-A) through said fixed network (FN).

24. A communication system according to claim 20, wherein
the fixed network (FN) is selected from the group consisting of a Public Switched Telephone Network PSTN, an Integrated Services Digital Network ISDN and a Packet Switched Public Data Network PSPDN.

25. A communication system consisting of a fixed network (PSTN, ISDN, FN) and a mobile radio communication network (GMSC, HLR, VMSC/VLR, MSC, PLMN-A) serving a number of mobile subscribers (MS1–MS4), the networks (FN, PLMN-A) being interconnected via a network interface (NI, ISUP), comprising:

a) the fixed network including a fixed network switching means (PABX, CPE, O-EX, T-EX) for receiving a call set-up request (IAM, SRI) from a call originating subscriber (SS1–SS4; MS1–MS8), said call set-up request having a first portion including a calling number (MS-ISDN) of a called mobile subscriber (MS) and a second portion including information about the type of call requested; and b) the mobile communication network comprising:

b1) a mobile radio communication network (PLMN-A) switching means (GMSC, HLR, VMSC/VLR, MSC) for receiving the call set-up request transferred from the fixed network switching means via said network interface; and b2) a contour storage means (CM) for storing for each subscriber (MS1–MS4) of said mobile radio communication network (PLMN-A) a number of predefined bearer capability contours (BCC1, BCC2, BCCN) indicating services supported by the mobile communication network for handling said different types of calls; and b3) a contour selection means (CSM) for comparing a content of said second portion of said received call set-up request (SRI) with said predefined bearer capability contours and for selecting a predefined bearer capability contour which provides a best match to said content of said second portion; and b4) an assembly means (AM) for composing a final mobile bearer capability ($BC_F$) from said contents of said received second portion (BC2) and said best match selected predefined bearer capability contour; and b5) a setting-up means (HLR, VMSC/VLR, MSC) for allocating bearer capabilities (BC) in the mobile radio communication network (PLMN-B) in accordance with said final mobile bearer capability ($BC_F$) and for setting-up said requested call to the mobile subscriber (MS) using said calling number (MS-ISDN) and said allocated bearer capabilities (Bci), wherein
said call originating subscriber is a mobile subscriber (MS5–MS8) of another mobile radio communication network (PLMN-B) and said call is set-up between said mobile subscriber of said another mobile radio communication network (PLMN-B) and said mobile subscriber of said mobile radio communication network (PLMN-A) through said fixed network (FN), and wherein
the mobile radio communication network (PLMN-A) and said another mobile radio communication network (PLMN-B) are selected from the group consisting of a Global System for Mobile Communications GSM, such as a D1 network or a D2 network, a Digital Cellular System at 1800 MHz such a E-PLUS or a Personal Communication System PCS.

26. A communication system according to claim 20, wherein
the fixed network (FN) comprises at least one Private Branch Exchange (PABX, CEP) to which said fixed subscribers (SS-1 . . . SS-4) are connected, one Originating Exchange (O-EX) connected to said Private Branch Exchange (PABX, CEP), one Terminating Exchange (T-EX) connected to said Originating Exchange (O-EX) and said network interface (NI).

27. A communication system according to claim 20, wherein
connection between said fixed subscribers (SS-1 . . . SS-4) and said at least one Private Branch Exchange (PABX, CEP) uses an internal subscriber protocol (①), a connection between said Private Branch Exchange (PABX, CEP) and said Originating Exchange (O-EX) uses a protocoll selected from the group consisting of an Access Protocol: DSSI and a national access protocol (②) and a connection between said Originating Exchange (O-EX) and said Terminating Exchange (T-EX) uses one selected from the group consisting of an ISUP and a National User Part and an analogue signalling protocol (③), wherein said network interface (NI) also uses one selected from the group consisting of an ISUP and a National User Part and an analogue signalling protocol (④).

28. A communication system according to claim 27, wherein
the Signalling System No. 7 is used for transporting the protocols (①, ②, ③, ④).

29. A communication system according to claim 20, wherein
said setting-up means comprises a Home Location Register (HLR) and a Visitor Mobile Switching Center/Visitor Location Register (VMSC/VLR) and a gateway mobile switching center (GMSC) of said mobile radio communication network (PLMN-A).

30. A communication system according to claim 29, wherein
said Home Location Register (HLR) is a database used by the mobile radio communication network (PLMN-A) to manage mobile stations (MS) and said Visitor Location Register (VLR) stores information about the mobile stations (MS), such as the location area where the mobile station is located.

31. A communication system according to claim 20, wherein
said different types of calls requested by said call originating subscriber (SS1–SS4; MS1–MS4) are one or more selected from the group consisting of a speech communication, facsimile communication, data communication or video communication.

32. A communication system according to claim 20, wherein
said information about the type of call is a compatibility information.

33. A communication system according to claim 32, wherein
said compatibility information is a set of attributes defining the features to support the requested type of call.

34. A communication system according to claim 33, wherein
said attributes are included in a Bearer capability (BC) and optionally in Higher Layer Compatibility (HLC) and Lower Layer Compatibility (LLC) information elements.

35. A communication system according to claim 34, wherein
said Bearer Capability (BC) is a coding of lower layer attributes used for the characterization of Basic Services and defines the technical features of the requested type of call.

36. A communication system according to claim 15, wherein
said mobile Bearer Capability (Mobile BC) indicates a requested Basic Service to be provided by said PLMN-A.

37. A communication system according to claim 36, wherein
said mobile Bearer Capability (Mobile BC) contains attributes representing the air-interface of the PLMN-A.

38. A communication system according to claim 20, wherein
said services comprise telecommunication services and basic services, wherein said basic services comprise bearer services and teleservices and wherein said telecommunication services are communication capabilities made available to a subscriber by a network operator.

39. A communication system according to claim 20, wherein
said types of calls selected from the group consisting of: facsimile calls, unrestricted data calls (UDI); 3.1 KHz data calls, a synchronous or asynchronous or packet or non-packet or PAD or transparent or non-transparent call and a call of a speed selected from the group consisting of 300 bit/s and 1200 bit/s and 75/1200 bit/s and 2400 bit/s and 4800 bit/s and 9600 bit/s and higher rates.

40. A communication system according to claim 33, wherein
said attributes are represented by one or more selected from the group consisting of a: Radio Channel Requirement, Transfer Mode, Information Transfer Capability, Structure, Negotiation of Intermediate Rate Requested, Rate Adaptation, Signalling Access Protocol, Synchronous/Asynchronous Service, User Information Layer 1 Protocol, Number of Stop bits, Negotiation, Number of Data Bits, User Rate, Intermediate Rate, Network Independent Clock on Transmit, Network Independent Clock on Receive, Party, Connection Element, Modem type and User Information Layer 2 Protocol, and other mobile bearer capability parameters.

41. A communication system according to claim 32, wherein
any other incoming parameters like those selected from the group consisting of the transmission medium requirements (TMR) and the calling party's category etc. are used as supplement to said compatibility information.

* * * * *